US011537331B2

(12) United States Patent
Mitsuhashi et al.

(10) Patent No.: US 11,537,331 B2
(45) Date of Patent: Dec. 27, 2022

(54) INFORMATION PROCESSING APPARATUS, METHOD THEREWITH AND NON-TRANSITORY COMPUTER READABLE MEDIUM STORING PROGRAM

(71) Applicant: FUJIFILM Business Innovation Corp., Tokyo (JP)

(72) Inventors: Hiroyuki Mitsuhashi, Kanagawa (JP); Hideaki Sugimoto, Kanagawa (JP); Nozomi Noguchi, Kanagawa (JP); Shigeo Miyata, Kanagawa (JP); Yu Mishima, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 193 days.

(21) Appl. No.: 16/658,164

(22) Filed: Oct. 21, 2019

(65) Prior Publication Data

US 2020/0133592 A1    Apr. 30, 2020

(30) Foreign Application Priority Data

Oct. 30, 2018    (JP) .............................. JP2018-204121

(51) Int. Cl.
*G06F 3/12* (2006.01)
*H04L 51/18* (2022.01)
(Continued)

(52) U.S. Cl.
CPC .......... *G06F 3/1204* (2013.01); *G06F 3/1226* (2013.01); *G06F 3/1254* (2013.01); (Continued)

(58) Field of Classification Search
None
See application file for complete search history.

(56) References Cited

U.S. PATENT DOCUMENTS

| 9,325,651 B2 | 4/2016 | Sakuta et al. |
| 2017/0012950 A1* | 1/2017 | Kim ..................... H04L 9/0891 |

(Continued)

FOREIGN PATENT DOCUMENTS

| JP | 2007004217 | 1/2007 |
| JP | 2014164522 | 9/2014 |

(Continued)

OTHER PUBLICATIONS

Office Action of Japan Counterpart Application, with English translation thereof, dated Aug. 23, 2022, pp. 1-5.

*Primary Examiner* — Fan Zhang
(74) *Attorney, Agent, or Firm* — JCIPRNET

(57) ABSTRACT

An information processing apparatus includes a section that detects posts of an output instruction and an output target from a user in a chat room, a registration section that registers the output target as an output target corresponding to the user or the chat room, in a case where identification information of an output device is not registered for the user or the chat room when the post of the output target is detected, and a control section that performs control of inputting a post of requesting registration of the output device from the user into the chat room in a case where the identification information of the output device is not registered for the user or the chat room when the post of the output instruction is detected.

20 Claims, 16 Drawing Sheets

(51) Int. Cl.
*H04L 51/046* (2022.01)
*H04L 51/02* (2022.01)

(52) U.S. Cl.
CPC ............ *H04L 51/02* (2013.01); *H04L 51/046* (2013.01); *H04L 51/18* (2013.01); *G06F 3/1288* (2013.01)

(56) References Cited

U.S. PATENT DOCUMENTS

2019/0258431 A1* 8/2019 Yamamoto ............ G06F 3/1222
2019/0369924 A1* 12/2019 Oka ...................... H04L 51/046

FOREIGN PATENT DOCUMENTS

| JP | 2019207513 | | 12/2019 | | |
|---|---|---|---|---|---|
| KR | 20180118590 | A * | 10/2018 | | |
| WO | WO-2016114744 | A2 * | 7/2016 | ........... | G06F 3/1271 |
| WO | WO-2019238391 | A * | 12/2019 | .............. | H04W 4/70 |

* cited by examiner

FIG. 4

| USER ID | REGISTERED PRINTER |
|---|---|
| A | a |
| B | - |
| C | c |
| ... | ... |

FIG. 5

| ROOM ID | REGISTERED PRINTER |
|---|---|
| 001 | d |
| 002 | e |
| 003 | - |
| ... | ... |

FIG. 16

| USER ID | REGISTERED PRINTER | AUTOMATIC RELEASE |
|---|---|---|
| A | a | ON |
| B | | |
| C | c | OFF |
| ... | ... | |

FIG. 17

| USER ID | CURRENT REGISTERED PRINTER | PREVIOUSLY-USED PRINTER |
|---|---|---|
| A | a | – |
| B | | b |
| C | c | – |
| ... | ... | |

INFORMATION PROCESSING APPARATUS, METHOD THEREWITH AND NON-TRANSITORY COMPUTER READABLE MEDIUM STORING PROGRAM

CROSS-REFERENCE TO RELATED APPLICATIONS

This application is based on and claims priority under 35 USC 119 from Japanese Patent Application No. 2018-204121 filed Oct. 30, 2018.

BACKGROUND

(i) Technical Field

The present invention relates to an information processing apparatus and a non-transitory computer readable medium storing a program.

(ii) Related Art

There is a software robot (hereinafter, a chatbot) that receives data included in a post of a user on a chat and performs specific processing on the data.

Among chatbots, there is a chatbot that operates an external output device in accordance with a post of a user on a chat room, for example, detects a document as a print target or a print instruction, which has been posted on the chat room by the user and transmits the document or the print instruction to a predetermined printing device so as to perform printing. An output device is registered in this type of chatbot in advance. The chatbot operates the registered output device in accordance with an instruction of a user, which has been posted in the chat room.

JP2014-164522A discloses that an external device is operated by a message from a user, and an operation result is displayed by a message for an instruction user as a destination, in a service of displaying a message in time series.

JP2007-004217A discloses that a document management server is disposed on an intranet, and a relay server is disposed on the Internet, in a network printing system in which a print server and a printer are disposed on the Internet. In a case where the document management server receives a print instruction of specific document data from a user, the document management server transfers the document data to the relay server. The relay server preserves the transferred document data to be allowed to be identified by document identification information. The print server receives a notification of the document identification information. The print server acquires the document data from the relay server based on the document identification information and causes the printer to print the document data.

SUMMARY

In a case where data (for example, image as a print target) to serve as an output target is posted on a chat room from a user in a state where an output device has not been registered in an information processing apparatus such as a chatbot, such type of information processing apparatus in the related art does not recognize the data as the output target or considers the post itself as an error such that printing is not possible. In a case where, after that, an output device is registered in the information processing apparatus, and then the output target is not reposted, it is not possible to output the output target from the output device.

Aspects of non-limiting embodiments of the present disclosure relate to an information processing apparatus and a non-transitory computer readable medium storing a program in which it is possible to control an output target to be output from a registered output device without an occurrence of a situation in which the output target posted in a chat room before identification information of the output device is registered is considered as an error.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided an information processing apparatus including a section that detects posts of an output instruction and an output target from a user in a chat room, a registration section that registers the output target as an output target corresponding to the user or the chat room, in a case where identification information of an output device is not registered for the user or the chat room when the post of the output target is detected, and a control section that performs control of inputting a post of requesting registration of the output device from the user into the chat room in a case where the identification information of the output device is not registered for the user or the chat room when the post of the output instruction is detected.

BRIEF DESCRIPTION OF THE DRAWINGS

Exemplary embodiment(s) of the present invention will be described in detail based on the following figures, wherein:

FIG. 4 is a diagram illustrating an example of a registered-printer information table;

FIG. 5 is a diagram illustrating another example of the registered-printer information table;

FIG. 16 is a diagram illustrating a registered-printer information table in which whether or not automatic release of registration is applied is prescribed for each printer;

FIG. 17 is a diagram illustrating the registered-printer information table in which an ID of a printer which has been previously used has been recorded.

DETAILED DESCRIPTION

Hereinafter, an exemplary embodiment of the present invention will be described with reference to the drawings, by using an example in which a chatbot that provides a printing service in accordance with a message from a user is used.

Outline of System

Figure 1:
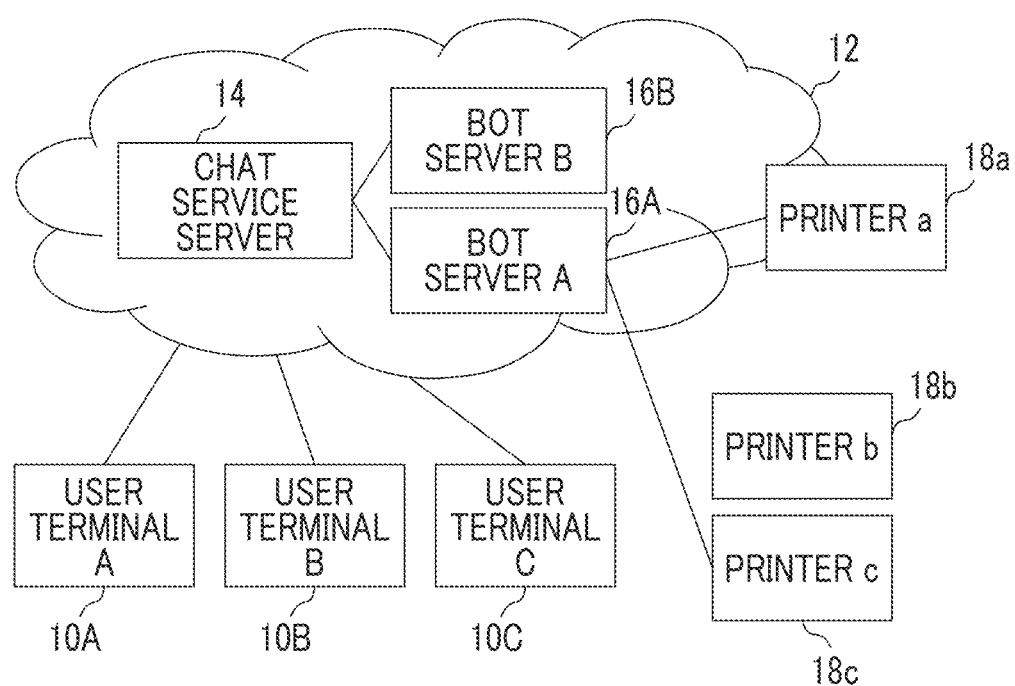
FIG. 1 is a diagram illustrating a system configuration of an exemplary embodiment.

FIG. 1 is a diagram illustrating an overall configuration of a message service system according to an exemplary embodiment. The message service system includes a user terminal A (10A) to a user terminal C (10C), a chat service server 14, a bot server A (16A) and a bot server B (16B), and a printer a (18a) to a printer c (18c).

The user terminal A (10A) to the user terminal C (10C) are terminals used by users of a message service. Information terminals such as smartphones, tablet terminals, or personal computers (PCs) are provided as the user terminals. FIG. 1 illustrates three terminals of the user terminal A (10A), the user terminal B (10B), and the user terminal C (10C), but the number of user terminals is randomly determined. Users operate the user terminal A (10A) to the user terminal C (10C) to access the chat service server 14 on a cloud 12 and to transmit and receive messages to and from other users or other chatbots. In the following descriptions, it is assumed that a user A operates the user terminal A, a user B operates the user terminal B, and a user C operates the user terminal C. The user terminal A (10A) to the user terminal C (10C) are connected to the chat service server 14 so as to be capable of transmitting and receiving data to and from each other through a wired or wireless communication network. As an example of a communication network, a public line such as the Internet is provided, and a dedicated line may be provided.

The chat service server 14 is a cloud server disposed on the cloud 12 and is a server that provides a chat service. The chat service server 14 includes one or a plurality of server computers. The chat service server 14 performs the whole processing relating to transmission and reception of a message to and from the user terminal A to the user terminal C. Examples of the above processing include processing of transmitting and receiving a message and processing of displaying a display screen in message transmission and reception. The chat service server 14 can form a group with three or more members and process transmission and reception of a message in the group, in addition to processing of transmitting and receiving a message between two members. In the following descriptions, an operation of transmitting and receiving a message and the like between two members and a place in which the transmission and reception are performed are referred to as a one-to-one chat or peer-to-peer chat. An operation of transmitting and receiving messages and the like in a group constituted by three or more members and a place in which the transmission and reception are performed are referred to as a group chat. The chat service server 14 holds a list of identifiers (for example, user ID) of members belonging to a group chat for each group chat. In a case where a virtual place in which a message and the like are transmitted and received between members in a chat service is particularly stated, the place is referred to as a chat room.

The chat service server 14 cooperates with the bot server A (16A) and the bot server B (16B) to process transmission and reception of messages to and from chatbots provided by the bot server 16A and the bot server 16B. In the present exemplary embodiment, the chatbot is handled as one of "members" who transmit and receive a message and the like on a chat. That is, the member includes both a user and a chatbot associated with a real person. Transmission and reception of a message and the like between a user and a chatbot includes transmission and reception of a message and the like between one user and a chatbot, and transmission and reception of messages and the like between a plurality of users and chatbot. That is, chatbot may participate with user in a manner of one-to-one chat, or participate in a group chat. A chatbot participates in a chat in response to an invitation from a user participating in the chat, for example.

The concepts for a message and the like transmitted and received between members in a chat include a message expressed in text and a message in a form of an image (representing post contents as with a so-called "stamp") or a uniform resource locator (URL), sound, and a motion image, for example. Such a message or the like is also referred to "a post" for a chat. This means that the post indicates information posted in a chat. An action of a member on a chat inputting such a message or the like in the chat is also referred to as "posting". This has the meaning as a behavior. Posting in a chat includes writing of a text message in a chat, transmitting of a stamp, attaching of a URL, inputting of data such as a file into a chat (for example, action of selecting data to be posted and pressing a post button), and the like.

A software robot program of a chatbot for transmitting and receiving a post to and from a user is installed on the bot server A (16A) and the bot server B (16B), and the bot server A (16A) and the bot server B (16B) execute the program. For the bot server A (16A) and the bot server B (16B), messenger service accounts assigned for advertisements or commercials, such as companies or stores may be operated.

The bot server A (16A) and the bot server B (16B) cooperate with the chat service server 14 via a specific application programming interface (API), and thus transmit and receive a post to and from a user. The bot server A (16A) and the bot server B (16B) automatically generate a response to the message from the user, and transmit the generated message as the response to the user. The specific API is an API for using the chat service server 14. Any format is used for the API. For example, an API of a JSON (abbreviation of Javascript (registered trademark) Object Notation) format is used as the API. Thus, JSON data of a prescribed format is transmitted to a specific URL of the chat service server 14 in a manner of POST or GET. A result is received in a form of data of the JSON format.

In a case where an operation instruction is included in a message from a user, the bot server A (16A) and the bot server B (16B) execute contents of a specific service in accordance with the operation instruction. In the present exemplary embodiment, in a case where a message from a user includes a print instruction, the bot server A (16A) functions as "a print bot" that operates the printer a (18*a*), the printer b (18*b*), or the printer c (18*c*) to perform printing processing, in accordance with the print instruction. The bot server 16B may provide any service in accordance with an operation instruction from a user. FIG. 1 illustrates two servers of the bot server A (16A) and the bot server B (16B). However, the number of bot servers is randomly determined. A plurality of chatbots may be constituted by one bot server. One chatbot may be constituted by a plurality of bot servers.

The bot server A as a chatbot (or a print bot) drives the printer a, b, or c to perform printing processing, in accordance with setting information regarding an operation of the software robot program. The setting information is registered for each user in advance. In the present exemplary embodiment, for each user or for each chat room, a printer used by the user or a printer used by a user participating in the chat room is capable of being dynamically registered in the chatbot.

The printer a (18*a*) to the printer c (18*c*) perform printing processing by a command from the bot server A.

Figure 2:
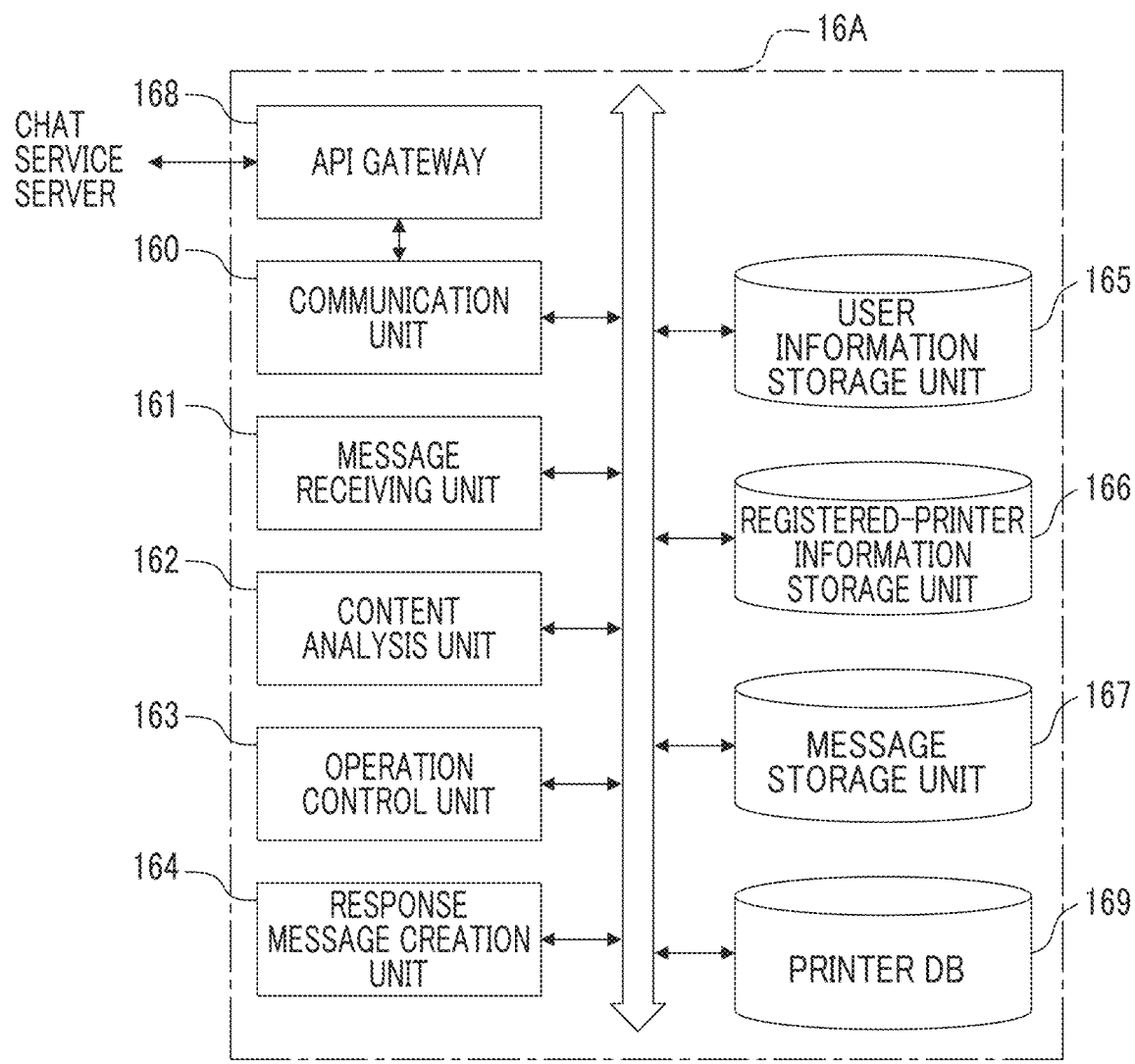
FIG. 2 is a functional block diagram illustrating the exemplary embodiment.

FIG. 2 is a functional block diagram illustrating the bot server A (16A). The bot server A includes a communication unit 160, a message receiving unit 161, a content analysis unit 162, an operation control unit 163, a response message creation unit 164, a user information storage unit 165, a registered-printer information storage unit 166, a message storage unit 167, an API gateway 168, and a printer DB (database) 169 as functional blocks.

The communication unit 160 communicates with the chat service server 14 and the printers a to c. The communication unit 160 communicates with the chat service server 14 via the API gateway 168 to exchange a post. The communication unit 160 outputs a post received from the chat service server 14 via the API gateway 168, that is, a post from the user terminal A, B or C to the message receiving unit 161. The communication unit 160 transmits a response message created by the response message creation unit 164 to the chat service server 14 (that is, transmits the response message to the user terminal A to the user terminal C) via the API gateway 168. The communication unit 160 outputs a print instruction to the printers a to c so as to drive the printers a to c, in accordance with a command from the operation control unit 163.

The message receiving unit 161 receives a post from the communication unit 160 and outputs the received post to the content analysis unit 162. The post from a user in a chat includes a print instruction or a response to an inquiry from the chatbot. The message receiving unit 161 sequentially stores the received post in the message storage unit 167.

The content analysis unit 162 analyzes the contents of the received post. For example, in a case where the contents of the post include a file, the content analysis unit 162 determines the file format of the file. Examples of the format of the file included in the post include a format of an image file, such as a PNG format or a JPEG format, a document file format which is generated by an application of a word processor or a spread sheet and is specific to the application, and a document file format for viewing, such as the portable document format (PDF). In a case where the post includes a message expressed by text, the content analysis unit 162 analyzes the text and outputs the result of the analysis to the operation control unit 163. Specifically, the content analysis unit 162 recognizes a user identifier (referred to as a user ID below) included in the received message. The content analysis unit 162 extracts the text part included in the message and analyzes the syntax of the extracted text part. Any method is used as a method of analyzing the syntax. For example, an input message is decomposed into morpheme units, and then nouns, adjectives, verbs, and question pronouns are extracted as keywords. In a case where the text part of a message includes an operation instruction, the content analysis unit 162 analyzes the contents of the operation instruction and outputs the result of the analysis to the operation control unit 163. In the present exemplary embodiment, the operation instruction includes a print instruction, a registration instruction of a printer, and an instruction as a response to an inquiry of a chatbot. In a case where the received post indicates a stamp, the content analysis unit 162 acquires semantic information associated with the stamp. The meaning indicated by a stamp is defined in the stamp in advance. A computer that performs processing of a chat can acquire the meaning of a stamp from the stamp itself or from the chat service server.

In a case where the post includes an image file, the content analysis unit 162 analyzes an image represented by the image file and determines whether or not the image is a code image having a predetermined code format such as QR code (registered trademark). It may be determined whether or not the image is a code image having a predetermined code format, by well-known methods. In the present exemplary embodiment, the chatbot has a function to receive a printer ID of a printer to be registered for a user or a chat room, in a format of a code image. In order to perform such a function, the content analysis unit 162 determines whether or not the post includes a code image.

In a case where the print instruction from the user is recognized based on the analysis result obtained by the content analysis unit 162, the operation control unit 163 determines whether or not a printer has been registered for the user or for a chat room in which the print instruction has been posted. In a case where the printer has been registered, the operation control unit 163 outputs the print instruction to the registered printer a, b, or c via the communication unit 160. In a case where it is determined that the printer is not registered for the user or the chat room, the operation control unit 163 cooperates with the response message creation unit 164 which will be described later, and posts a message and the like of requesting registration of a printer from the user or in the chat room. In a case where identification information (referred to as a printer ID below) of a printer is posted from the user in response to the message and the like, the printer ID is registered as information of a printer used for the user or in the chat room.

The response message creation unit 164 creates post information indicating an analysis result in the content analysis unit 162 or response contents in response to the instruction from the operation control unit 163, and transmits the post information to the chat service server 14 via the communication unit 160. An example of the post information regarding the response is the above-described message of requesting registration of a printer.

The user information storage unit 165 stores information of a user using the chat service server 14, in particular, information of a user using a chatbot in the bot server A, in a form of a table. Regarding the chatbot, a specific account on a chat service in the chat service server 14 is assigned, and a user designates the account and performs a predetermined operation (for example, operation meaning "friend" addition). In this manner, chatbot to be used is determined. Examples of the information of a user, which is stored by the user information storage unit 165 include a user ID and information regarding various authorities of the user.

The registered-printer information storage unit 166 stores information of a printer registered for a user or a chat room. For example, the registered-printer information storage unit 166 stores a printer ID of a printer registered for each user.

The message storage unit 167 stores a message from a user, which has been received by the message receiving unit 161, as a history.

The printer DB 169 is a database in which information of a printer allowed to be controlled by a chatbot has been registered. As information of each printer, which has been stored in the printer DB 169, a printer ID of a printer is provided. In the printer DB 169, information, for example, a communication address (for example, IP address) and capability (for example, whether or not duplex printing is performed and whether or not color printing is performed) of a printer may be stored. A group of printers registered in the printer DB 169 is a population of printers allowed to be registered for a user or a chat room.

Figure 3:
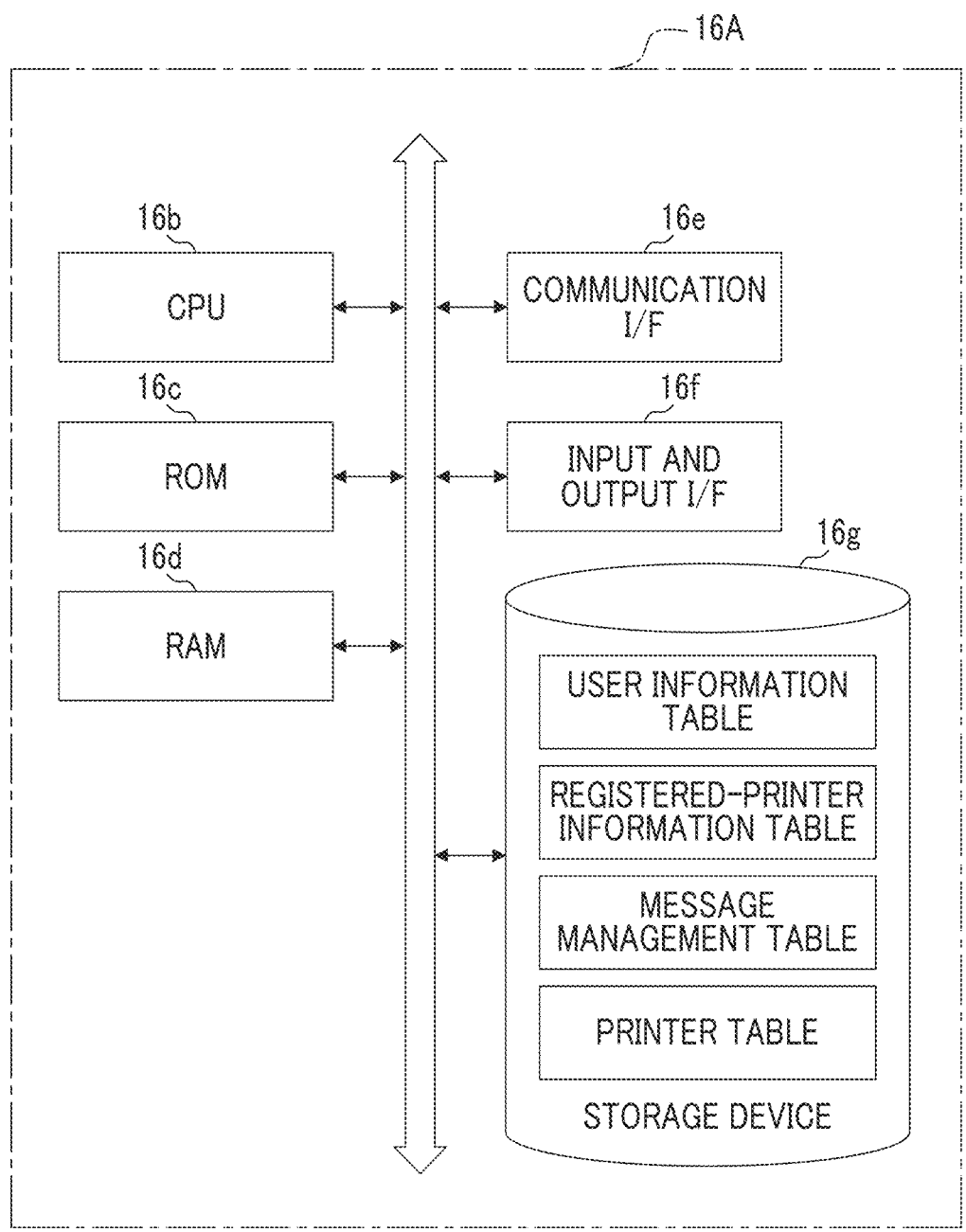
FIG. 3 is a block diagram illustrating a configuration of the exemplary embodiment.

FIG. 3 is a block diagram illustrating a configuration of the bot server A. The bot server A is constituted by one or a plurality of server computers. The bot server A includes one or a plurality of CPUs 16b, a ROM 16c, a RAM 16d, a communication interface (I/F) 16e, an input and output I/F 16f, and a storage device 16g.

The one or a plurality of CPU 16b have function as the chatbot by reading a chatbot application stored in the ROM 16c or the storage device 16g and using the RAM 16d as a working memory. That is, the CPU 16b automatically responds to a message from a user. In a case where the message from the user includes an operation instruction, the CPU 16b drives the printers a, b or c in accordance with the operation instruction. The CPU 16b, by executing the bot application, works as the message receiving unit 161, the content analysis unit 162, the operation control unit 163, the response message creation unit 164, and the API gateway 168 in FIG. 2.

The communication I/F 16e transmits and receives a message to and from the chat service server 14 and outputs a print instruction to the printers a, b or c.

The input and output I/F 16f receives data from an input device such as a keyboard or a mouse, and transmits data to an output device such as a display device.

The storage device 16g is configured with a non-volatile memory such as a hard disk drive (HDD) or a solid state drive (SSD). The storage device 16g stores the bot application and stores a user information table, a printer information table, a message management table, and a printer table. The storage device 16g works as the user information storage unit 165, the registered-printer information storage unit 166, the message storage unit 167, and the printer DB 169 in FIG. 2.

In the present exemplary embodiment, the CPU executes the software robot program for implementing the chatbot. However, a portion of the chatbot may be implemented by hardware processing not processing by executing the program. The hardware processing may be performed, for example, with a circuit such as an ASIC or a field programmable gate array (FPGA).

FIG. 4 illustrates an example of a registered-printer information table stored in the registered-printer information storage unit 166. In the example, in the registered-printer information table, a printer ID of a registered printer for a user is stored in association with a user ID of the user. In a case where a user instructs a chatbot to perform printing on a chat, and a printer ID of a registered printer for the user is stored in the registered-printer information storage unit 166, the chatbot causes the registered printer to perform printing processing relating to the print instruction.

FIG. 5 illustrates another example of the registered-printer information table stored in the registered-printer information storage unit 166. The table illustrated in FIG. 4 stores the printer ID of the registered printer associated with the user. The table illustrated in FIG. 5 stores the printer ID of the registered printer associated with a chat room. That is, in the table illustrated in FIG. 5, a printer ID of a registered printer as being used in a chat room is registered in association with identification information (referred to as a room ID below) of the chat room. In a case where a user instructs a chatbot to perform printing on a chat, and a printer corresponding to a printer ID for the chat room on the chat has been registered in the registered-printer information storage unit 166, the chatbot causes the printer to perform printing processing relating to the print instruction.

Whether a printer is registered for each user or chat room may be uniformly determined in the bot server 16A or may be individually set for each user or chat room. Both printer registration for each user and printer registration for each chat room may be accepted. In this case, printers may be registered for both a user who has performed a print instruction on a chat room and the chat room. Information for a method of handling such a case may be set in the bot server 16A. Here, the information of the handling method is, for example, a rule of determining a registered printer caused to perform printing among the registered printer for the user and the registered printer for a chat room in which a print instruction has been posted, in response to the print instruction from a user. Alternatively, the information of the handling method may be information for inquiring a printer to perform printing in such a case from the user on the chat room.

Operation of Chatbot

Next, an example of control performed by a chatbot (that is, bot server 16A or 16B) in the present exemplary embodiment will be described.

Figure 6:
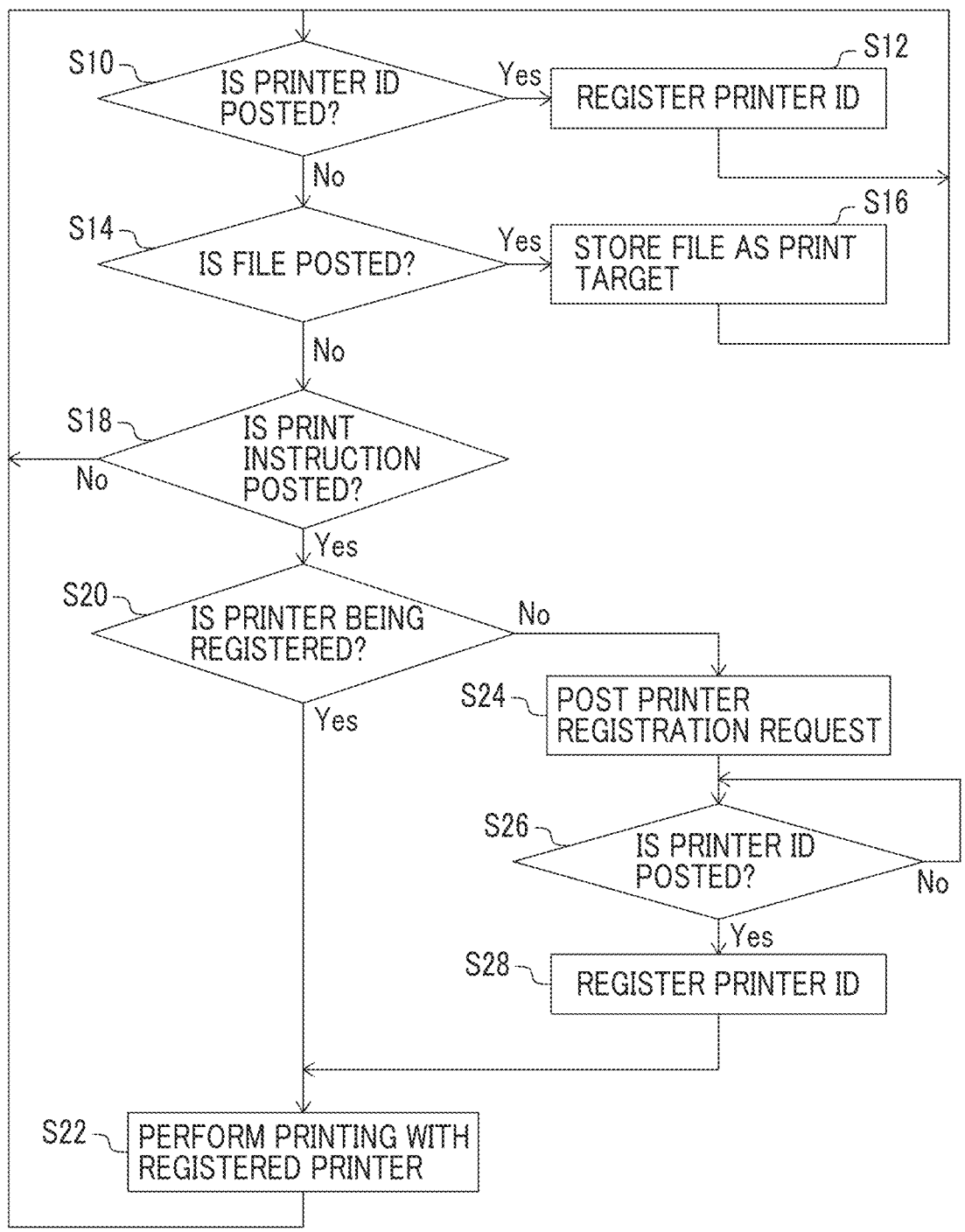
FIG. 6 is a diagram illustrating an example of a processing procedure of a chatbot, which relates to registration and printing of a printer.

FIG. 6 schematically illustrates an example of a processing procedure of the chatbot. It is assumed that the chatbot is participating in a chat (that is, chat room). Here, descriptions will be made by using a case where a printer is registered for each user will be described as an example.

The chatbot monitors a post of a user in a chat. In a case where the chat is a group chat, and a plurality of users participates in the chat, the chatbot monitors a post of each user.

During monitoring, the chatbot determines whether a post from a user indicates a printer ID (S10), indicates a file as a print target (S14), and indicates a print instruction (S18).

In a case where the printer ID has been posted (determination result in S10 is Yes), the chatbot registers the printer ID corresponding to the user ID of the user in the registered-printer information table (see FIG. 4) (S12). In a case where a file such as an image file or a document file, which may serve as a print target has been posted (determination result in S14 is Yes), the chatbot preserves the file as the print target, in association with the user ID of the user (S16).

In a case where the post from the user indicates neither the printer ID, the file, nor the print instruction (that is, determination result in S18 is No), the chatbot causes the process to return to S10 and waits for the next post from the user. That is, the chatbot does not react to a post for a general communication between the users, which does not relate to printing.

As another example, in a case where the chat room is a room for one-to-one chat between a user and a chatbot, and the determination result in S18 is No, the chatbot may post a message of requesting reposting of a brief instruction to the chat room. In the chat room for one-to-one chat between the user and the chatbot, any of registration of a printer ID, a file as a print target, or a print instruction is posted from the user. Thus, in a case where the chatbot is not capable of recognizing all the registration of a printer ID, the file as a print target, and the print instruction, there is a possibility that there is a problem that the posted contents are complicated, for example. Thus, the chatbot requests, from the user, to perform posting with brief contents again. Reversely, in a case where the chat room is a room for a group chat in which a plurality of users and a plurality of chatbots participate, and the determination result in S18 is No, a post as a target is likely to be sent to another user. Thus, the chatbot may ignore this post.

In this manner, the chatbot may switch an operation in a case where the determination result in S18 is No, depending on whether the chat room in which the chatbot participates is for one-to-one chat or a group chat.

In a case where the post from the user indicates a print instruction (determination result in S18 is Yes), the chatbot examines whether or not a printer corresponding to the user has been registered in the registered-printer information table (S20). In a case where it is determined that the printer has been registered, in S20, the chatbot transmits the file as the print target, which has been stored in S16 such that the printer prints the file (S22). When a post indicating a print instruction is detected, in a case where a file as a print target is not posted, the chatbot transmits a post having contents of requesting posting of a file as a print target, into the chat room. The chatbot causes the printer to print the file posted from the user in response to the posting.

In a case where it is determined, in S20, that the printer corresponding to the user is not registered in the registered-printer information table, the chatbot transmits a post having contents of requesting registration of a printer ID of a printer to be used in printing this time into the chat (S24).

The printer ID is posted on the chat, for example, in a manner that a code image such as QR code (registered trademark), which indicates the printer ID is captured by a camera of a portable terminal (for example, smartphone) of the user who displays the screen of the chat, and the user inputs the captured image into the chat. Here, for example, the code image indicating the printer ID is displayed on the screen by being called from the menu on a user interface (UI) screen of the printer desired to be used by the user. A seal on which the code image has been printed may be attached to the printer. The printer ID may be posted by a method of inputting text indicating the printer ID into the chat.

After S24, the chatbot waits for posting the printer ID from the user in response to the request post (S26). In a case where the printer ID is posted, the chatbot registers the printer ID in the registered-printer information table in association with the user ID of the user (S28). The chatbot transmits the file as the print target, which has been stored in S16, to the printer registered this time, and thus causes this printer to print the file (S22).

As described above, in a case where the print instruction is received from the user on the chat, and the printer to be used by the user is not registered, the chatbot requests registration of the printer (that is, input of the ID of the printer to be desired to be used) from the user on the chat. In a case where the user inputs the printer ID in response to the request, the printer indicated by the printer ID is caused to print a target document of the print instruction.

In the present exemplary embodiment, the registration of the printer is basically handled as being temporary. That is, in a case where a predetermined registration release condition is satisfied even though an explicit registration release instruction is not received from the user, the chatbot automatically releases the registration of the printer. As the registration release condition, for example, a condition in which predetermined time has elapsed in a state where the user does not use the registered printer is provided.

As described above, one of the reason for which registration of the printer is automatically released is that it is considered that a terminal used for a chat service by a user is a portable terminal in many cases. Since a user moves in a state of holding a portable terminal, the physical place of the user participating in a chat with the portable terminal is not fixed. Therefore, in a case where a method of fixedly registering a printer is used, and printing is performed when a user is in a place different from a place in which the fixedly-registered printer is provided, a problem occurs without the intention of the user. That is, in a case where the user performs a print instruction without an operation of changing a printer to be used, print output is performed from the registered printer in the place different from the current place of the user. Thus, in the present exemplary embodiment, a printer to be used by a user is set to be temporarily registered, and a simple operation of registering a printer for a chatbot (for example, capturing of a code image indicating a printer ID as described above) is set to be performed when the user wants printing. Accordingly, the mistakes of the user operation are reduced.

Figure 7:
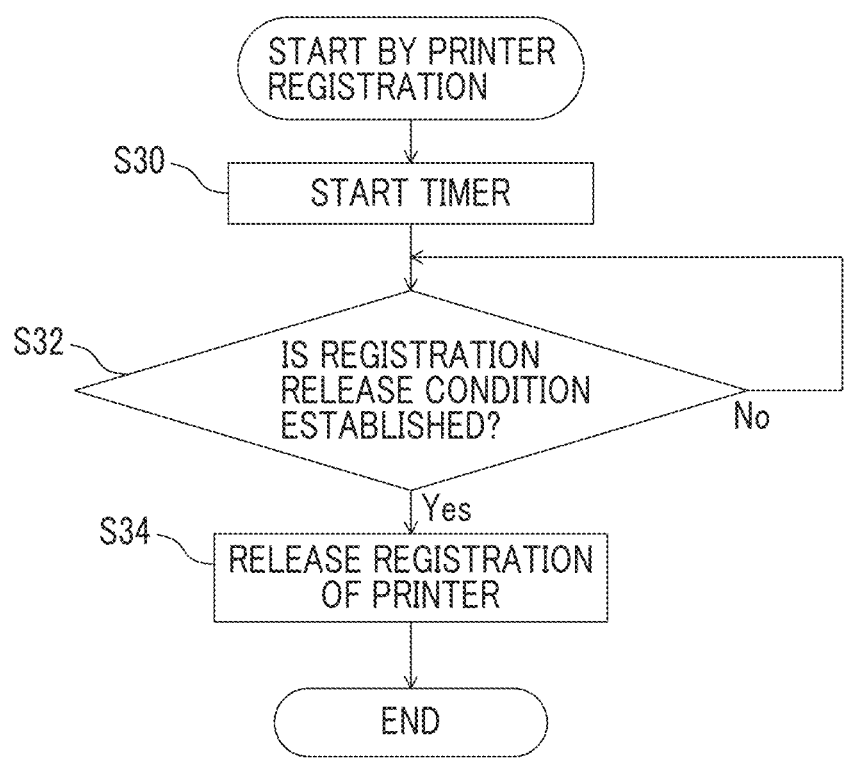
FIG. 7 is a diagram illustrating an example of a processing procedure of the chatbot, which relates to registration release of the printer.

FIG. 7 schematically illustrates a procedure of controlling registration release of a printer. The procedure is performed by the chatbot. The procedure starts with a trigger which is set to a state where a printer associated with a user has been registered. The chatbot starts the procedure and starts a timer (S30). The timer is used for one of the registration release condition. The timer is used for counting time in which the registered printer is not used. In a case where a message indicating that the user intends to use the printer, such as a post of a document as a print target or a print instruction, is posted on a chat, the remaining time of the timer is reset (initialized) or prolonged. For example, the chatbot regularly determines whether or not the registration release condition in which the timer times out (that is, remaining time reaches 0) is established (S32). In a case where the registration release condition is established, the chatbot releases the registration of the printer for the user in the registered-printer information table, that is, deletes the printer ID corresponding to the registered printer of the user, in the table (S34).

Above, the descriptions are made by using a case where the printer is registered for each user, as an example. However, similar processing may also be performed in a case where the printer is registered for each chat room.

Detailed Example of Operation of Chatbot

Next, a more-detailed example of a procedure of an operation of the chatbot will be described with reference to FIGS. 8 and 9. In the example, it is assumed that a method in which a user captures a code image of a printer ID with a camera called from a chat application screen of a portable terminal is used as an operation of registering the printer for the chatbot.

Figure 8:
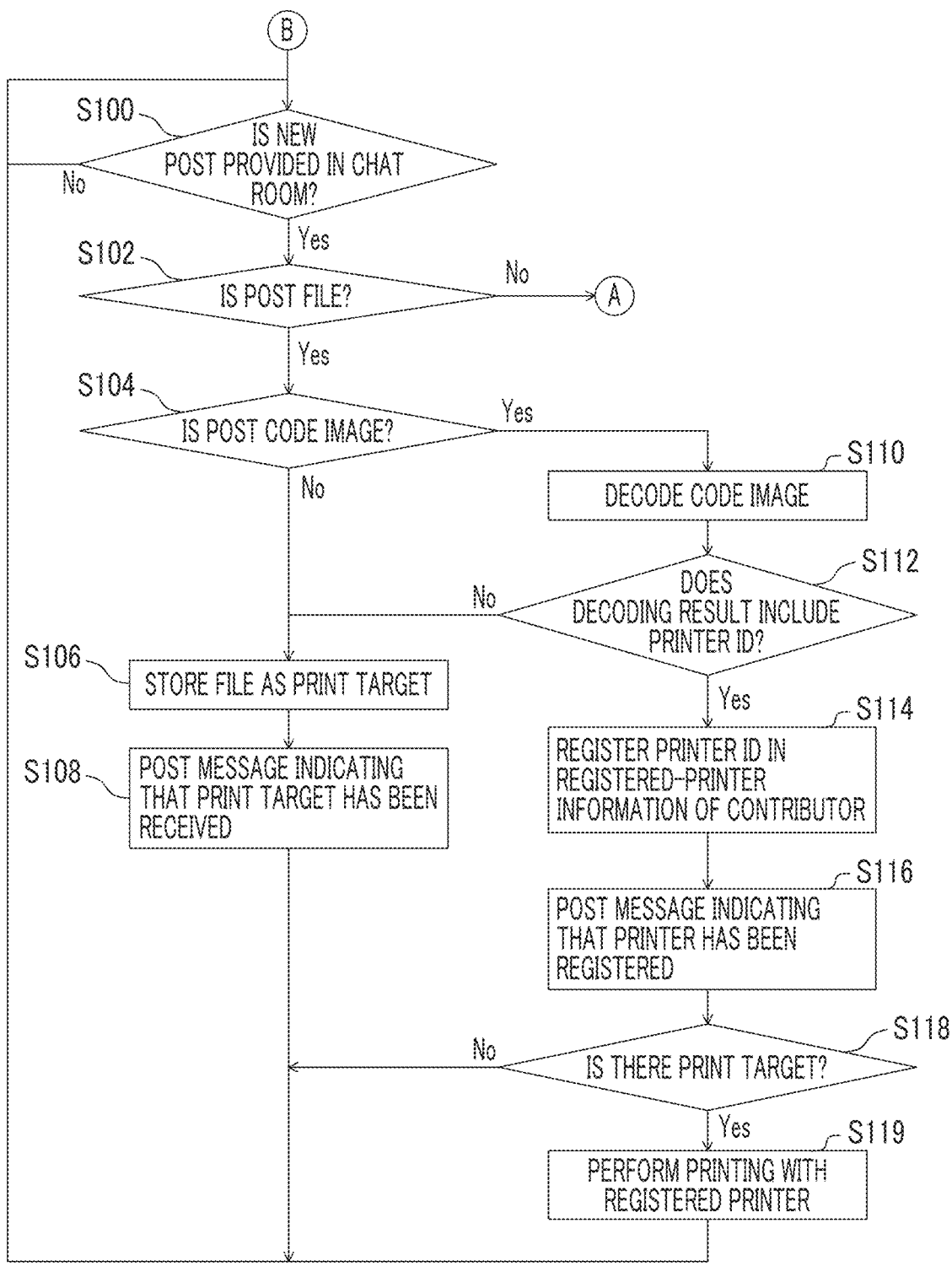
FIG. 8 is a diagram illustrating a portion of a more-detailed example of the processing procedure of the chatbot, which relates to registration and printing of the printer.

As illustrated in FIG. 8, firstly, the operation control unit 163 of the chatbot waits for a new post in a chat room in which the chatbot participates (S100).

In a case where the operation control unit 163 receives a notification indicating that a new post has been made, from the message receiving unit 161, the operation control unit 163 causes the content analysis unit 162 to determine whether or not the post includes a file such as an image file or a document file (S102). In a case where a result of the determination is Yes, the operation control unit 163 causes the content analysis unit 162 to determine whether or not the contents of the file indicate a code image (S104).

In a case where a result of the determination in S104 is No, the file has a possibility as a print target. Thus, the operation control unit 163 preserves the file in association with the user ID of a user who has made the post (S106). The operation control unit 163 posts a response message indicating that the print target has been received, in the chat room by the response message creation unit 164 (S108). The operation control unit 163 causes the process to return to S100, and waits for a new post.

In a case where the determination result in S104 is Yes, the operation control unit 163 causes the content analysis unit 162 to decode the code image indicated by the file (S110) and receives a decoding result. Then, the operation control unit 163 determines whether or not the decoding result includes a printer ID (S112). In a case where a result of the determination in S112 is No, the operation control unit 163 preserves the file as a print target, in association with the user ID of the user (S106). The operation control unit 163 posts a message indicating that the print target has been received, into the chat room (S108) and then causes the process to return to S100.

In a case where the determination result in S112 is Yes, the operation control unit 163 registers the printer ID as the decoding result in the registered-printer information table, in association with the user ID of the user (contributor) (S114). Then, the operation control unit 163 causes the response message creation unit 164 to post a response message indicating that printer registration has been accepted, in the chat room (S116). The operation control unit 163 examines whether or not the file as the print target, which corresponds to the user is preserved (S118). In a case where the file is preserved, the operation control unit 163 transmits the file to the printer corresponding to the printer ID which has been registered this time, and causes the printer to print the file (S119). Then, the operation control unit 163 causes the process to return to S100 and waits for a new post. In a case where the print target is not preserved in S118, the operation control unit 163 causes the process to return to S100.

Figure 9:
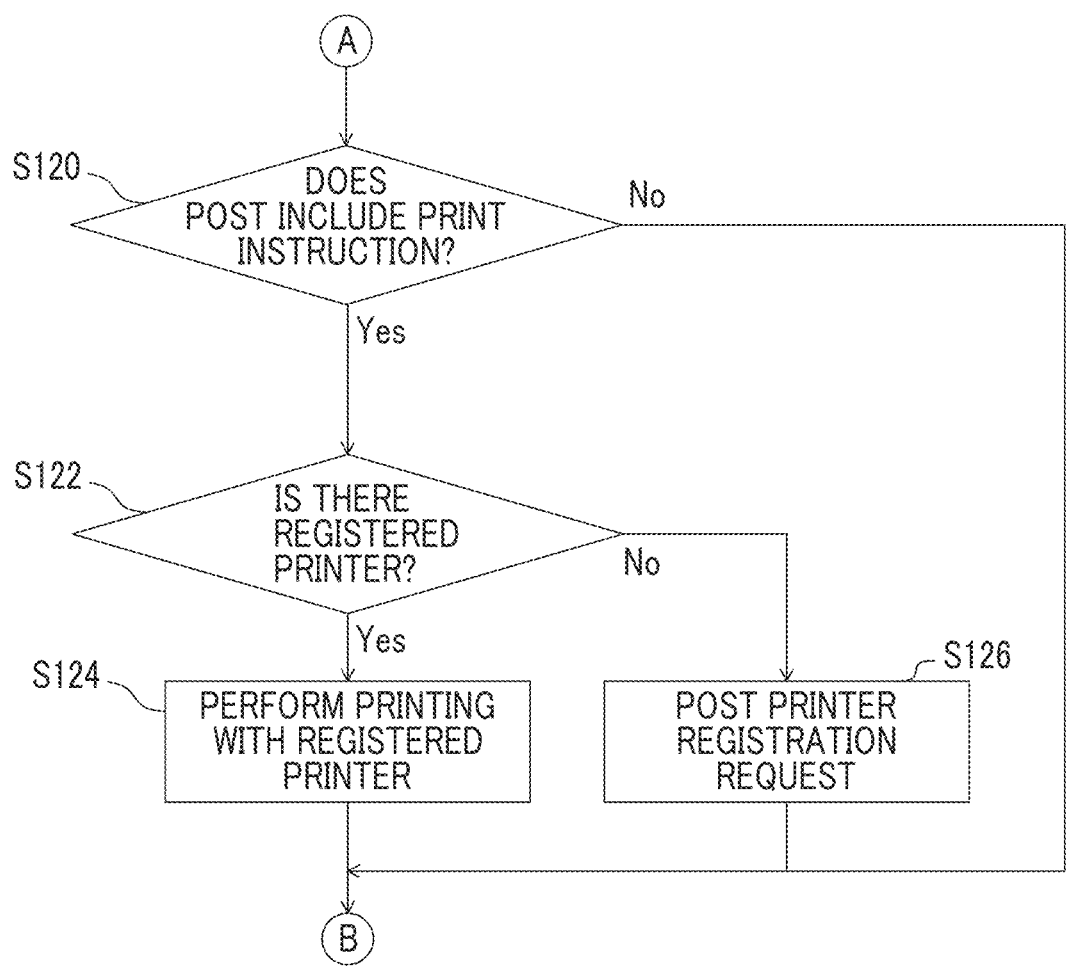
FIG. 9 is a diagram illustrating remaining portions of the more-detailed example of the processing procedure of the chatbot, which relates to registration and printing of the printer.

In a case where the determination result in S102 is No, that is, in a case where the new post detected in S100 does not include the file, the operation control unit 163 proceeds a procedure illustrated in FIG. 9 in a case where the contents of the post is a text message or a stamp.

In the procedure, the operation control unit 163 causes the content analysis unit 162 to analyze the contents of the post and determines whether or not the contents of the post indicate a print instruction (S120). For example, the operation control unit 163 performs natural language analysis on the message having the contents of the post and determines whether or not the contents indicate a print instruction. In a case where the determination result in S120 is Yes, the operation control unit 163 examines whether or not the printer ID corresponding to the user ID of the user has been registered in the registered-printer information table (S122). In a case where the printer ID has been registered, the operation control unit 163 causes the printer corresponding to the printer ID to print the file as a print target (S124) and causes the process to return to S100 in FIG. 8.

In a case where the determination result in S122 is No, the operation control unit 163 causes the response message creation unit 164 to post a message or the like of requesting registration of a printer, in the chat room (S126). Then, the operation control unit 163 causes the process to return to S100 in FIG. 8.

The user views the message or the like posted in the chat room and calls a camera from the chat application. Then, the user captures a code image indicating the ID of a printer which is near to the user and is desired to be used, with the camera. The user posts the captured image in the chat room. The operation control unit 163 recognizes the printer ID by the procedure in FIG. 8 (S110 and S112), in response to the post. The operation control unit 163 registers the printer ID in association with the user (S114), and then performs printing processing in accordance with the print instruction recognized in S120, with the printer corresponding to the printer ID (S119).

In the procedure in FIG. 9, it is assumed that posting of the file as the print target is completed before the print instruction is posted in the chat room. On the other hand, in a case where the assumption is not established, the operation control unit 163 may recognize the print instruction in S120, and then examine whether or not the file as the print target is preserved in association with the ID of the user who has performed the instruction. In a case where the file is not preserved, a message of urging to post the file as the print target may be posted in the chat room.

Whether or not the decoding result of the code image includes the printer ID is determined in S112, for example, by examining whether or not text of the decoding result satisfies a specific condition and includes the item of the printer ID prescribed by the specific condition. As an example, information of the printer ID is set to be expressed in the JSON format as exemplified below. {"print_bot_version": "1.0", "type": "type_id", "printer_id": "12345678", "expiration_time":"201812310000"}

In the example, in a case where the text of the decoding result includes {"print_bot_version": "1.0"} and {"type": "type_id"} in the JSON format, the operation control unit 163 determines that the text indicates an authorized printer ID. The value "12345678" of the item "printer_id" included in the text is recognized as the printer ID.

Example of Chat Screen in Case Where Printing is Performed

Figure 10:
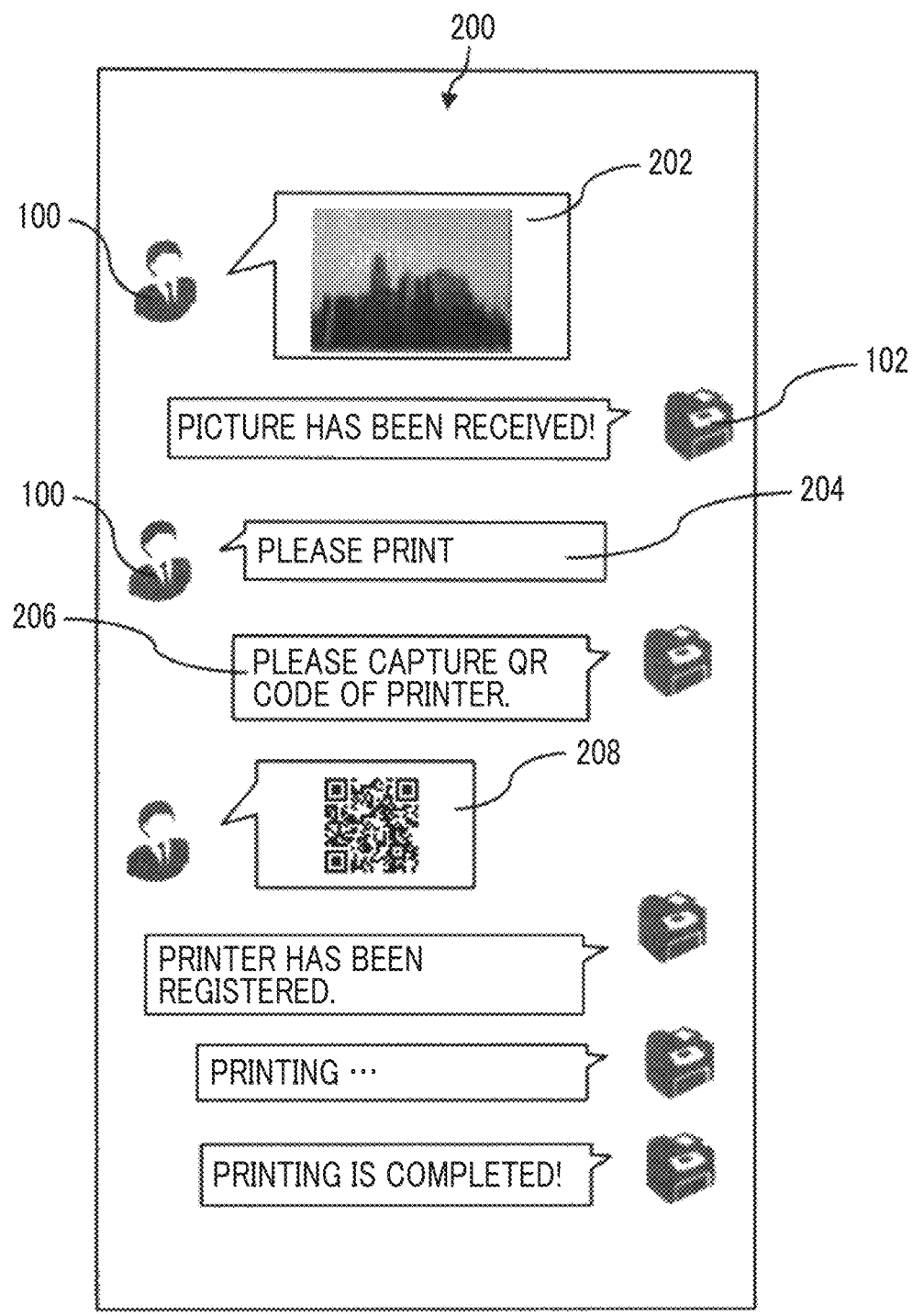
FIG. 10 is a diagram illustrating an example of a screen display of a chat.
Figure 11:
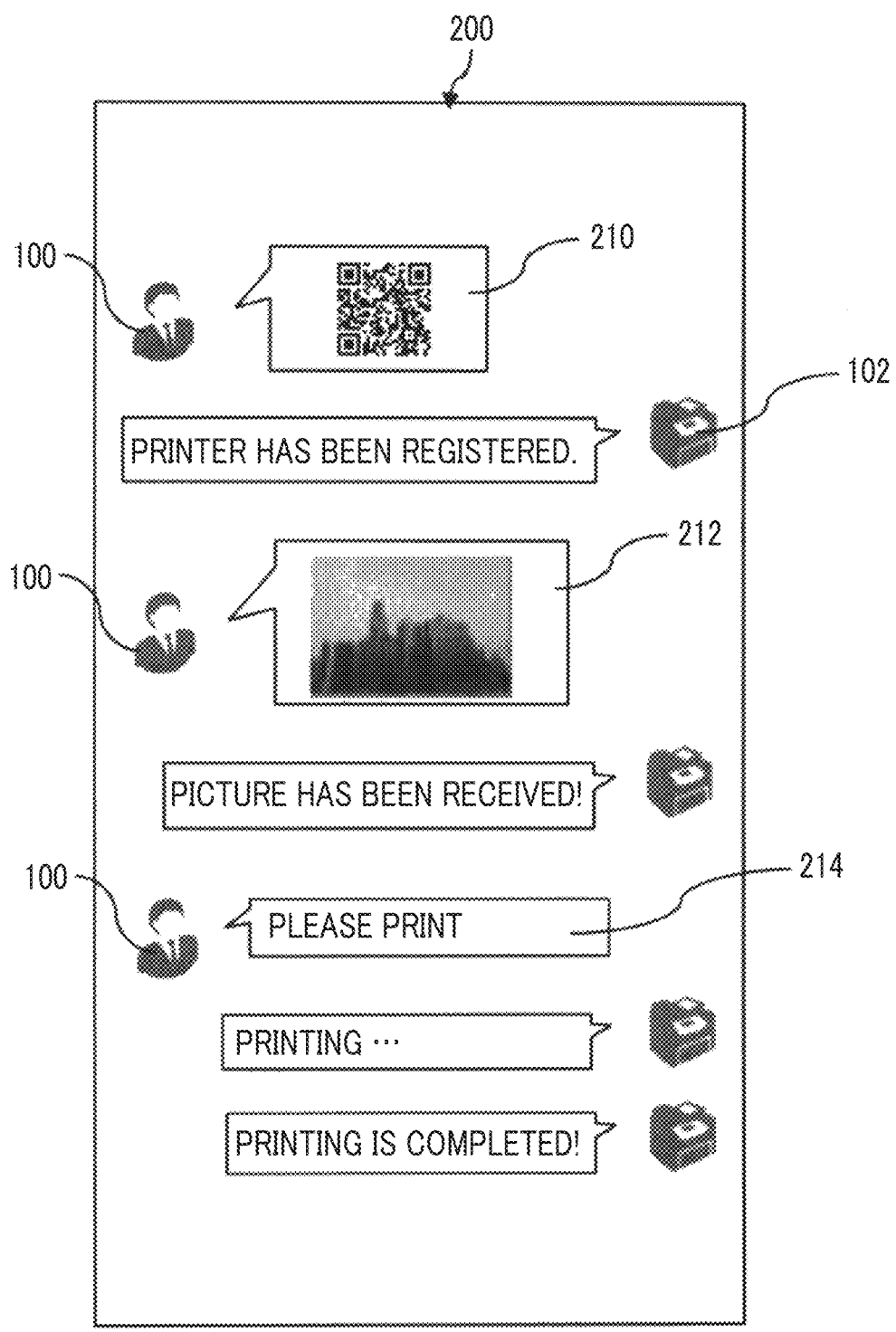
FIG. 11 is a diagram illustrating another example of the screen display of the chat.

The processing performed by the chatbot in the present exemplary embodiment is exemplified above. Next, an example of a chat performed by a user and a chatbot in a chat room will be described with reference to FIGS. 10 and 11. FIG. 10 and illustrate a chat screen 200 generated by a client application for a chat service, which has been installed on a terminal (for example, portable terminal) of the user. In FIGS. 10 and 11, an icon 100 indicates the user, and an icon 102 indicates the chatbot. For simple descriptions, the user indicated by the icon 100 is referred to as a user 100 below, and the chatbot indicated by the icon 102 is referred to as a chatbot 102.

In the example illustrated in FIG. 10, firstly, the user 100 posts an image file of a picture in the chat room (post 202 in FIG. 10). The chatbot 102 determines that the post includes the image file, and the image file is not a code image, in accordance with the procedure in FIG. 8, for example. The chatbot 102 preserves the image file as a print target in association with the user ID of the user 100, in accordance with the determination. Then, the chatbot 102 inputs a post of "picture has been received!" indicating that the print target (picture in this case) has been received into the chat room.

The user 100 inputs a post 204 of text "please print" into the chat room. The content analysis unit 162 in the chatbot analyzes the text of the post 204 and determines that the text indicates a print instruction. With the determination, the operation control unit 163 examines whether or not the ID of a registered printer corresponding to the user 100 has been registered in the registered-printer information table. In the example, it is assumed that the printer is not registered.

In this case, the operation control unit 163 in the chatbot 102 causes the response message creation unit 164 to input a post 206 of requesting registration of the printer into the chat room. The exemplified post 206 includes a message which indicates that "please capture QR code of the printer" and is used for explaining a registration operation. In response to the request, the user 100 causes a camera of a portable terminal to capture QR code printed on a seal attached to a printer near to the user 100 (or QR code displayed on a UI screen of the printer). Then, the user 100 inputs a post 208 including an image as a capturing result into the chat room.

The chatbot 102 recognizing the post 208 decodes the QR code in the post 208 to acquire a printer ID. The chatbot 102 registers the printer ID in the registered-printer information table in association with the user 100. The chatbot inputs a post indicating that the printer has been registered into the chat room and causes the printer corresponding to the printer ID to print the image file in the post 202, which has been stored as a print target. In a case where printing is started, the chatbot 102 inputs a post indicating that printing is in the progress into the chat room. In a case where printing is completed, the chatbot 102 posts a message indicating that the printing is completed into the chat room.

The example in FIG. 11 is an example in a case where a registration instruction of the printer is performed before the post of a print target or a print instruction is made by the user. In the example, firstly, the user 100 causes the camera of the portable terminal to capture QR code of the printer near to the user 100 and posts the captured image in the chat room. A post 210 includes the image of the QR code. The chatbot 102 decodes the QR code in the post 210 to acquire a printer ID, in accordance with the procedure in FIG. 8, for example. The chatbot 102 registers the printer ID in the registered-printer information table in association with the user 100. The chatbot inputs a post indicating that the printer has been registered into the chat room.

Then, the user 100 inputs a post 212 including an image file desired to be printed into the chat room. The chatbot 102 preserves the image file included in the post 212, as a print target, and posts a message indicating that the image file has been received as the print target.

Then, the user 100 inputs a post 214 meaning a print instruction into the chat room. The chatbot 102 receiving the post causes the printer which has been previously registered to print the image file as the print target.

Example of Detailed Processing when Printer is Registered

Figure 12:
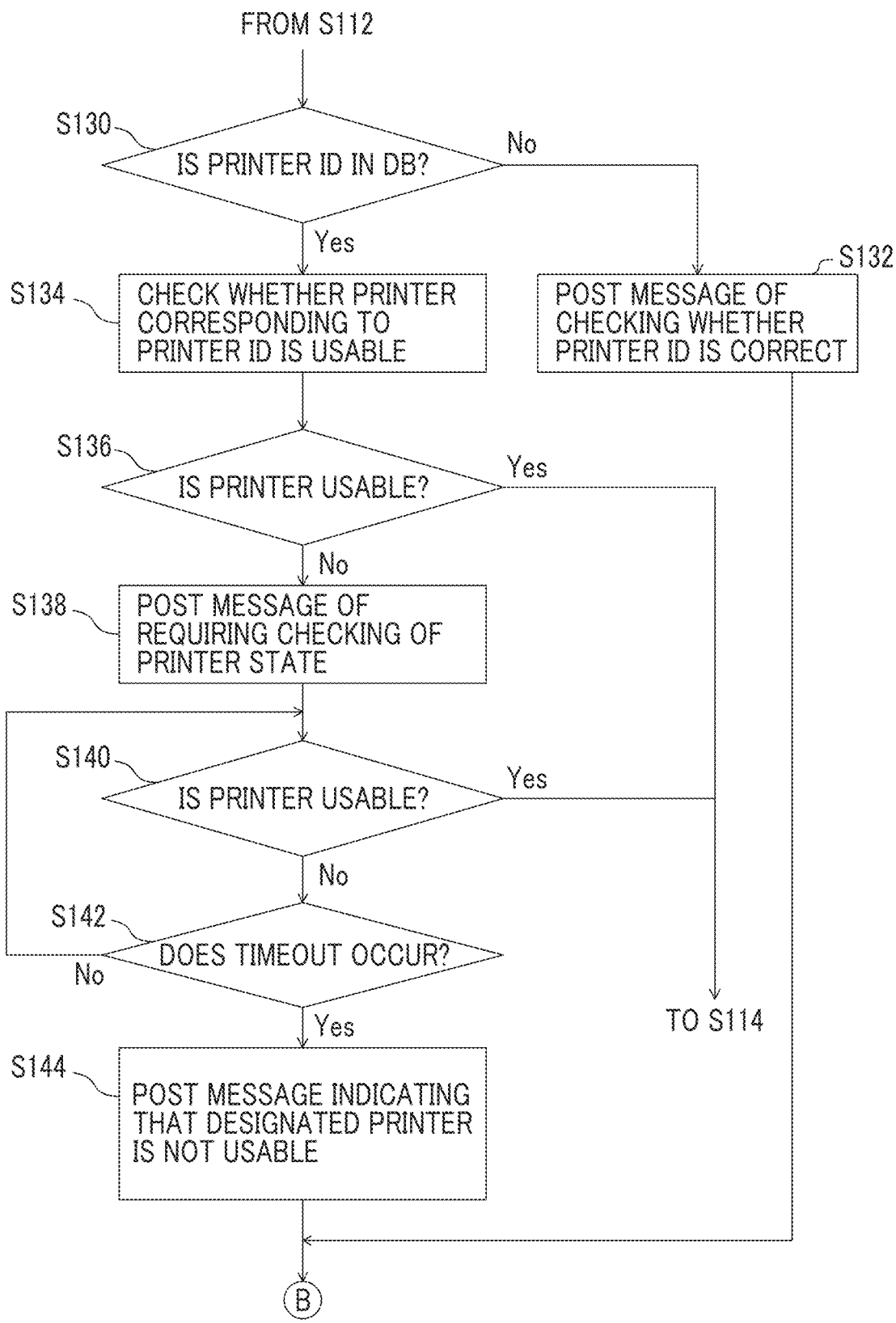
FIG. 12 is a diagram illustrating an example of a procedure of processing of checking a printer of which an instruction of registration has been performed.

In the above-described procedure in FIG. 10, in a case where the chatbot recognizes the printer ID from the code image posted by the user, the chatbot registers the printer ID as the printer for the user and causes the printer to perform printing. However, there may be a case where the printer having the recognized printer ID does not exist, or power is cut off in spite of existing, and thus it is not possible to perform printing. FIG. 12 illustrates a processing procedure of the chatbot measuring in such a case.

The procedure illustrated in FIG. 12 are inserted between S112 and S114 in the procedure in FIG. 8. In the procedure, the chatbot examines whether or not the printer ID recognized in S110 and S112 has been registered in the printer DB 169 (S130). In a case where the printer ID is not registered, the printer ID is incorrect (that is, the corresponding printer does not exist). In this case, the chatbot posts a message having contents of checking whether the input printer ID is correct into the chat room (S132) and causes the process to return to S100 in FIG. 8. There is hardly a possibility that the printer ID recognized from the code image is incorrect. However, there is a possibility that the printer ID is incorrect, in a case of the printer ID input in text into the chat room.

In a case where the determination result in S130 is Yes, the chatbot checks whether or not the printer corresponding to the printer ID is usable, over the network (S134). In the checking processing, the chatbot inquires whether or not the printer corresponding to the printer ID operates, from the printer via the network. The chatbot determines whether the printer is usable, based on whether or not a response to the inquiry is received or on the response contents. For example, in a case where the response to the inquiry is received, the printer is determined to be usable. In a case where the response is not received, the printer is determined not to be usable. The chatbot determines whether the printer is usable, by the checking processing in S134 (S136).

In a case where the printer is determined to be usable, the chatbot proceeds to S114 in the procedure in FIG. 8, and thus registers the printer ID in the registered-printer information table.

In a case where the printer is determined not to be usable, the chatbot registers a message of requiring checking of the printer state, for example, "It is not possible to connect the designated printer. Please check power of the printer and network connection.", into the chat room (S138). The user views the message and checks the power of the printer and the like so as to attempt to cause the printer to be in a usable state via the network. After S138, the chatbot regularly performs an inquiry to the printer, for example, so as to check whether or not the printer is usable (S140). In a case where the printer is usable, the chatbot proceeds to S114 in the procedure in FIG. 8.

The chatbot waits for predetermined time for the printer to become usable, after the post in S138 (S142). In a case where it is not possible to check that the printer is usable even though the chatbot waits for the predetermined time (determined to be timeout in S142), the chatbot posts a message indicating that using the designated printer is not possible, into the chat room (S144) and causes the process to return to S100 in FIG. 8.

Next, a modification example of the procedure in FIG. 12 will be described with reference to FIGS. 13 and 14. In the modification example, control is performed such that a state in which the same printer is simultaneously registered for a plurality of persons does not occur.

In a case where one printer has been registered for a plurality of persons, the printer may perform in accordance with print instructions of the persons almost simultaneously. In such a case, a situation in which a person erroneously takes and views a print result corresponding to a print instruction of another person by hand, or erroneously takes away the print result may occur. In particular, in a case where the printer is in a place such as a convenience store, in which unspecified persons can access the printer, such a situation may be a big problem. Thus, in the modification example, to avoid such problem, the state where one printer is simultaneously registered for a plurality of persons is restricted.

Figure 13:
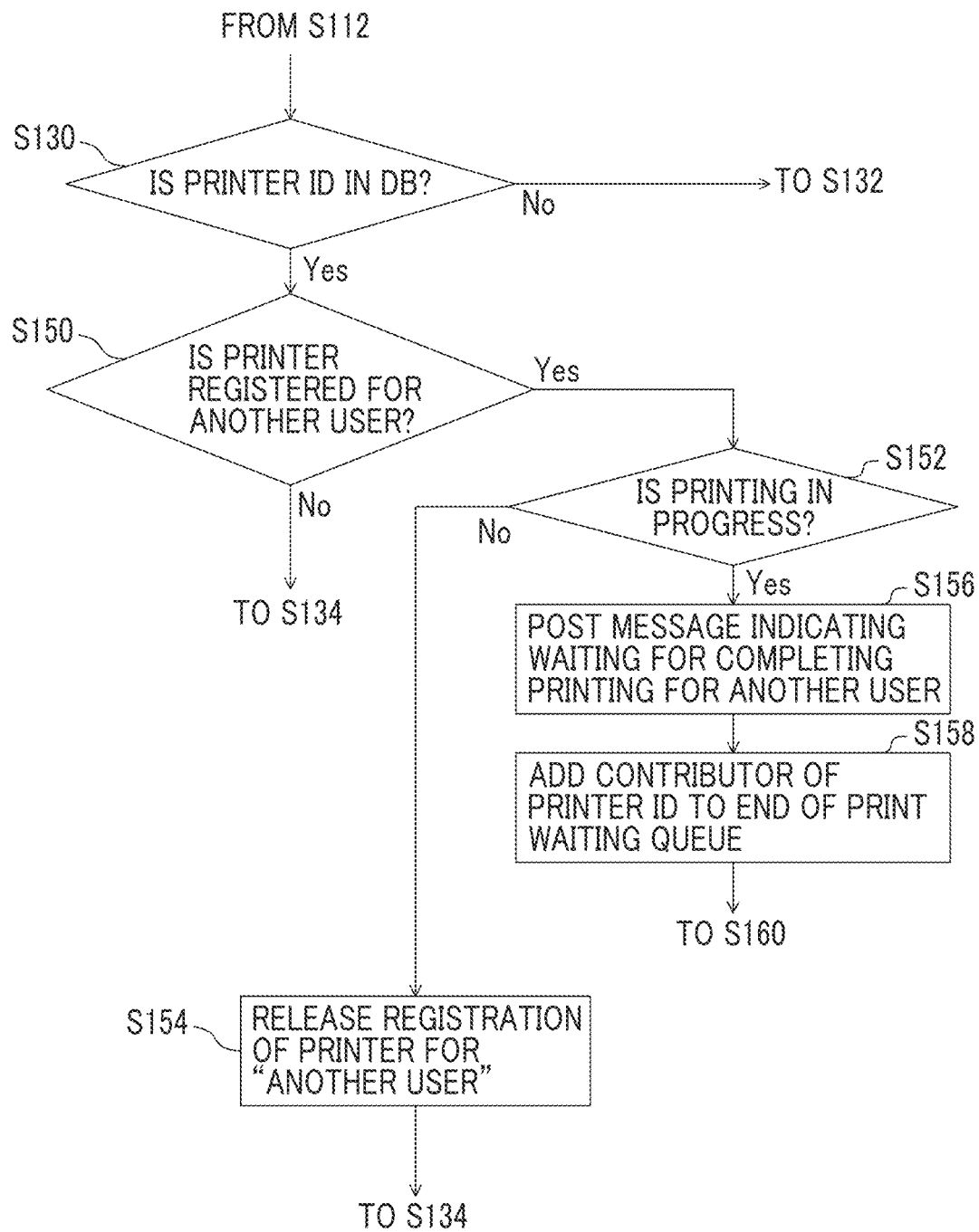
FIG. 13 is a diagram illustrating a portion of an example of a processing procedure of the chatbot in a case where the printer of which the instruction of registration has been performed by a user has been registered for another user.

In the procedure in FIG. 13, in a case where it is determined, in S130, that the printer ID recognized in S110 and S112 in FIG. 8 has been registered in the printer DB 169, the chatbot examines the registered-printer information table to determine whether or not the printer ID has also been registered for another user (S150). In a case where the printer ID is not registered for another user, the chatbot proceeds to S134 in the procedure in FIG. 12.

In a case where the printer ID has been registered for another user, in S150, the chatbot determines whether or not the printer is performing printing in accordance with a print instruction of "another user" (S152). For simple descriptions, a user desiring registration of the printer ID is referred to as a user A below. "Another user" for whom the printer ID is determined to be registered in S150 is referred to as a user B below. In a case where it is determined, in S152, that printing is not in progress, the chatbot releases the registration of the printer ID for the user B (that is, deletes the printer ID from data of the user B in the registered-printer information table) (S154). At this time, the chatbot may post a message indicating the registration of the printer has been released, into a chat room in which the user B participates. The chatbot proceeds to S134 and registers the printer ID for the user A.

In a case where the determination result in S152 is Yes, the chatbot posts a message indicating that the printer to be desired to be registered is being used by another user, for the user A on the chat room (S156). Then, the chatbot adds the user A to the end of a print waiting queue (S158). The chatbot proceeds to S160 in the procedure in FIG. 14. The print waiting queue is prepared in the memory and the like of the bot server 16A or 16B, for each printer ID. The print waiting queue holds a user ID of a user who waits for registering a printer indicated by the printer ID, in an FIFO manner.

Figure 14:
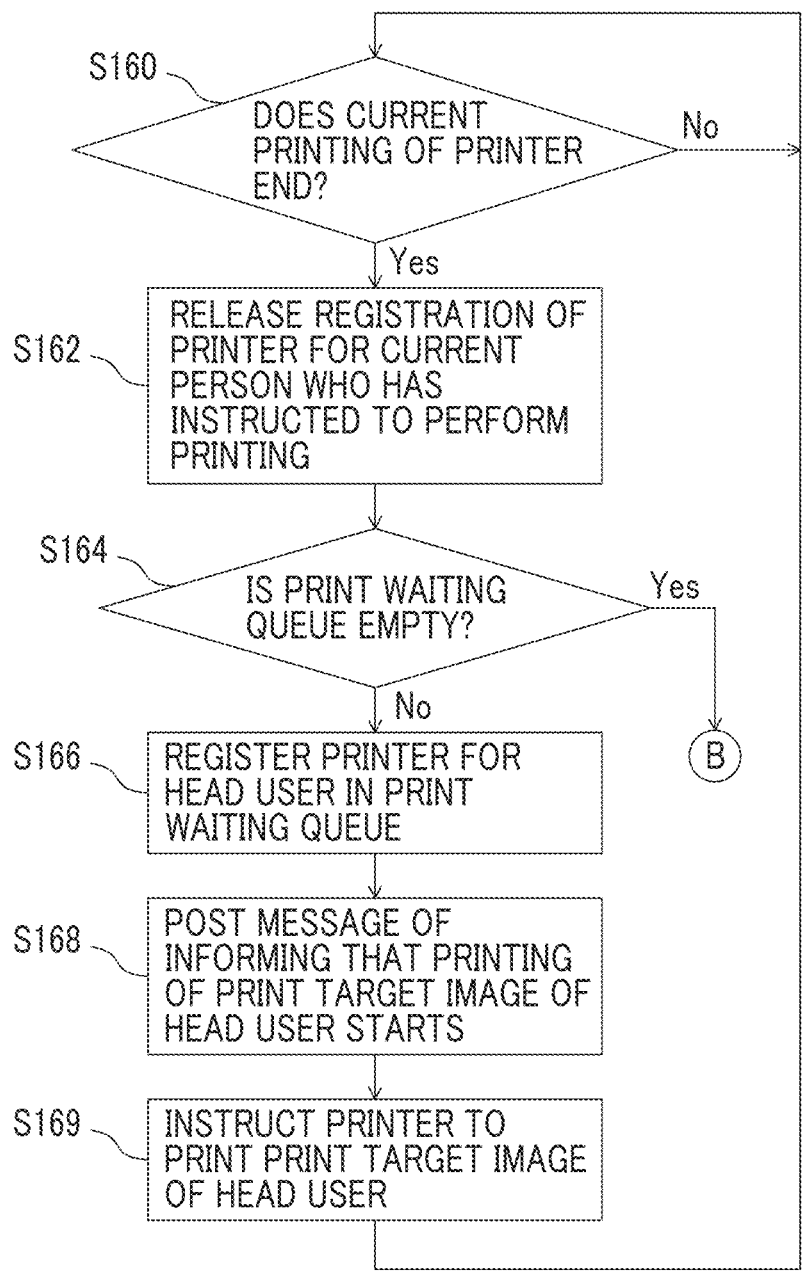
FIG. 14 is a diagram illustrating remaining portions of the example of the processing procedure of the chatbot in a case where the printer of which the instruction of registration has been performed by the user has been registered for another user.

In S160 in FIG. 14, the chatbot waits for that current printing processing being performed by the printer corresponding to the printer ID ends. In a case where the printing processing ends, the chatbot releases the registration of the printer ID for the current user (that is, user B) who has performed an instruction to perform the printing processing (S162). At this time, the chatbot may post a message indicating that the registration of the printer for the user B has been released for another user, into the chat room in which the user B has performed an instruction to register the printer ID.

Then, the chatbot examines whether or not the print waiting queue corresponding to the printer ID is empty (S164). In a case where the determination result in S164 is No, that is, in a case where the user ID remains in the print waiting queue, the chatbot extracts the head user ID in the print waiting queue and registers the printer ID for the user ID (that is, registers the printer ID in the registered-printer information table in association with the user ID) (S166). The chatbot inputs a post indicating that printing has started into a chat room in which a user having the head user ID has performed a print instruction (S168). The chatbot transmits the file and the like as the print target, which has been preserved in association with the head user, to the printer corresponding to the printer ID and causes the printer to perform printing (S169). Then, the process returns to S160.

In a case where the determination result in S164 is Yes, that is, in a case where a user ID in a not-processed state is not provided in the print waiting queue corresponding to the printer ID, the chatbot causes the process to return to S100 in FIG. 8.

As described above, with the procedure in FIGS. 13 and 14, the number of users to which one printer is assigned at the same time is limited to one. The specific procedure illustrated in FIGS. 13 and 14 is just an example, and another procedure for implementing the same processing may be used.

Detailed Example of Automatic Registration Release of Printer

Next, a detailed example of a procedure of controlling registration release of a printer will be described with reference to FIG. 15.

The procedure starts with a trigger which is set to a state where a printer associated with a user has been registered. The chatbot starts the procedure and starts a timer (S170).

The chatbot determines whether or not the user participates in a chat room in which the user has performed an operation of registering the printer (for example, posting of a code image) (S172). The determination may be performed by an inquiry from the chat service server 14. In a case where the user does not participate in the chat room (that is, after the registration operation, the user has left the chat room), the chatbot releases the registration of the printer for the user (S188) and ends the procedure. Because the user has left the chat room, the printer is not to be used for a while.

In a case where the user participates in the chat room, the chatbot determines whether or not the user has posted a new print target (for example, file of an image) or a new print instruction into the chat room (S174). In a case where a result of the determination is Yes, the chatbot initializes the remaining time of the timer or prolongs the timer by a predetermined length (S176). In a case where the user posts a file or the like as a print target or a print instruction, it is considered that the user intends to use the printer, and there is a possibility of inputting a post relating to printing by the printer continuously after the post. Thus, the timer is prolonged.

Then, the chatbot determines whether or not the timer has timed out (that is, the remaining time has reached 0) (S178). In a case where the timer has timed out, the chatbot releases the registration of the printer for the user (S188) and ends the procedure. In a case where the timer has timed out, it is considered that the user does not use the printer at least for a while. Thus, the registration is released.

In a case where the determination result in S178 is No, the chatbot determines whether or not the remaining time of the timer is equal to or smaller than a predetermined threshold (S180). In a case where the determination result is Yes, the chatbot inputs a post of inquiring, to the user, whether or not the registration of the printer is extended, into the chat room (S182) and waits for a response from the user. In a case where a post of requiring the extension is received from the user within predetermined time in response to the inquiry (determination result in S184 is Yes), the chatbot initializes the remaining time of the timer or prolongs the timer by a predetermined length (S186). Then, the chatbot causes the process to return to S172. In a case where the post of requiring the extension is not received within the predetermined time, or in a case where a post indicating that the extension is not required is received, the chatbot skips S186 and causes the process to return to S172.

Figure 15:
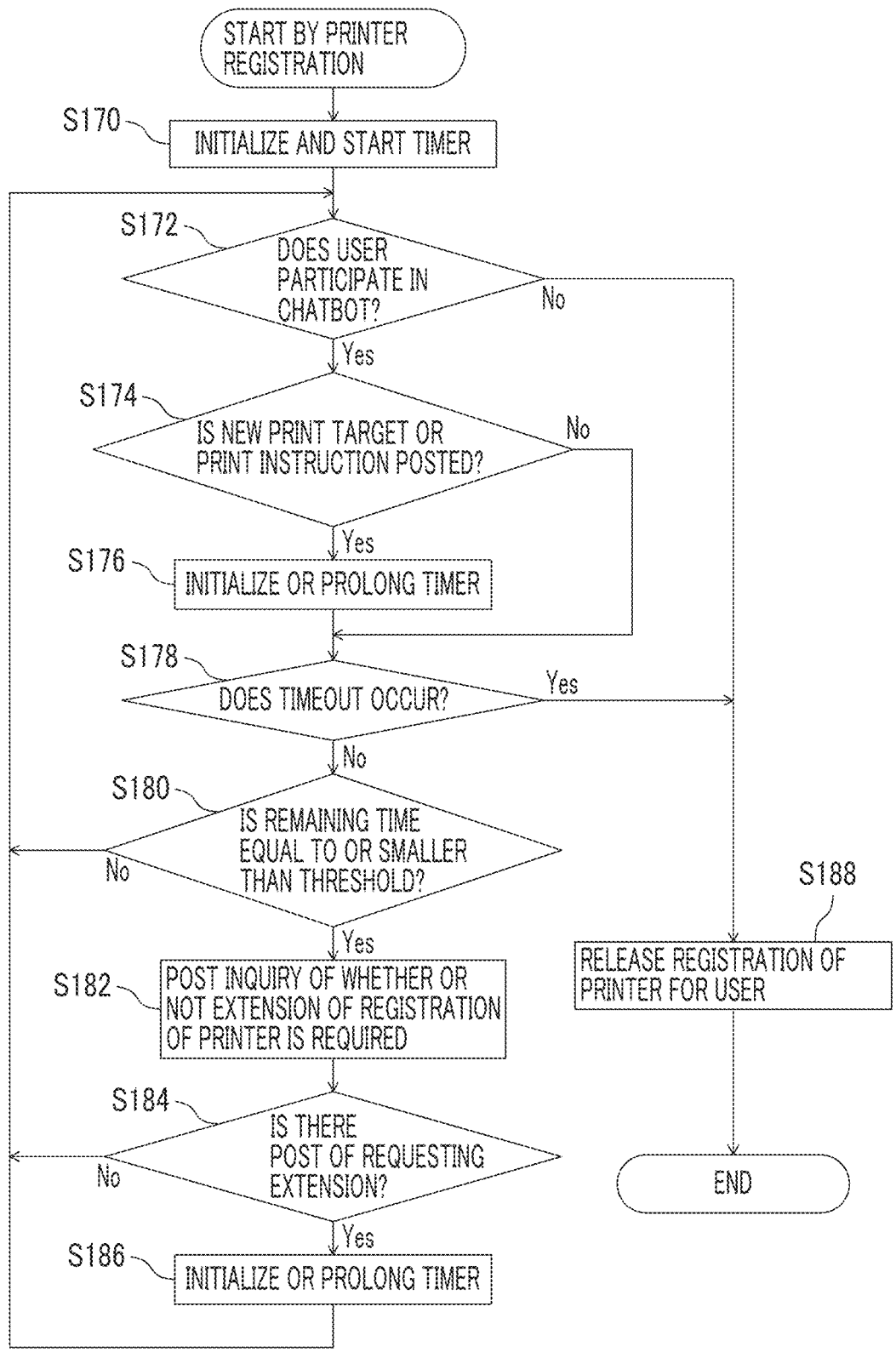
FIG. 15 is a diagram illustrating a detailed example of a procedure of releasing registration of the printer.

Although not illustrated in FIG. 15, the chatbot may release the registration of the printer in a case where the chatbot receives a post of an instruction to release the registration of the printer, from the user explicitly.

As described above, in the example, in a case where the user has left the chat room, the registration of the printer for the user is released in a case where a state where a message intending to use the printer is not posted for predetermined time or in a case where an explicit release instruction is received.

As another example of a case where the printer registration is automatically released, there is a case where the chatbot leaves a chat room in which the chatbot participates, in accordance with an instruction from the user for the chat room. In this case, the chatbot releases the registration of the printer, which has been performed in accordance with an instruction of the user on the chat room.

As still another example, in a case where printing of a printer is completed, the registration of the printer for a user may be released.

The automatic release of printer registration described above may not be necessarily applied to all printers. It may be determined whether or not automatic release is applied, for each printer. For example, in a case where whether or not automatic release is applied is registered in the printer DB 169 for each printer ID, and a user registers a printer, the chatbot may determine whether or not the registration is automatically released, with reference to the printer DB 169. Information indicated by a code image displayed on a seal attached to a printer or on a screen of the printer may include information indicating whether or not the printer is a target of applying automatic release, in addition to the printer ID. In this case, as illustrated in FIG. 16, in a case where a code image is posted from the user, the chatbot registers a printer ID indicated by the code image in the registered-printer information table in association with the user and registers information indicating whether or not the printer ID is a target of automatic registration release, in the registered-printer information table. In the example in FIG. 16, in a case where the value of automatic registration release in the table is "ON", the printer is a target of applying automatic release. In a case of "OFF", the printer is not the target of applying automatic release.

Regarding a printer to which automatic release is not applied, in a case where the printer is registered for a user or the like, the chatbot does not cancel the registration until an explicit release instruction is received. In a case where the above-described control in FIGS. 13 and 14 is applied to a printer, registration of the printer for a user may be released in order that another user uses the printer, even in a case where automatic registration release is not applied to the printer.

In a case where the chatbot receives an instruction indicating registration of a printer B which is a target of applying automatic release, from the user in a state where a printer A without applying automatic release has been registered for the user, the chatbot temporarily releases the registration of the printer A for the user and registers the printer B. In a case where the registration of the printer B is automatically released, the chatbot may register the printer A which has been previously registered, for the user again. That is, the printer A without applying automatic release is handled as one kind of default printer. In a case where an instruction indicating that another printer C without applying automatic release is registered is received from a user in a state where the printer A without applying automatic release has been registered for the user, the default printer is switched from the printer A to the printer C.

Simplification of Re-Registration Operation of Printer in which Registration has been Automatically Released As in the above-described example, in a case where the chatbot automatically releases printer registration for a user, when the user attempts to use the same printer again, the same registration operation is required to be performed again.

An example of avoiding complex operations of a user performing re-registration in such a case will be described below.

In the example, in a case where the chatbot preserves the ID of a printer which has been registered by a user and then of which the registration is automatically released, and the user performs a print instruction in a chat room again, the chatbot inquires, from the user, whether or not the printer having the preserved ID is used again, in the chat room. In a case where a post indicating that the printer is used again is received from the user in the chat room in response to the inquiry, the chatbot registers the preserved printer ID in association with the user.

FIG. 17 illustrates an example of the registered-printer information table in the example. In the exemplified table, the printer ID (field of "current registered printer" in FIG. 17) of a registered printer and the printer ID (field of "previously-used printer") of a printer of which registration is released after previously being used are registered in association with a user ID.

Figure 18:
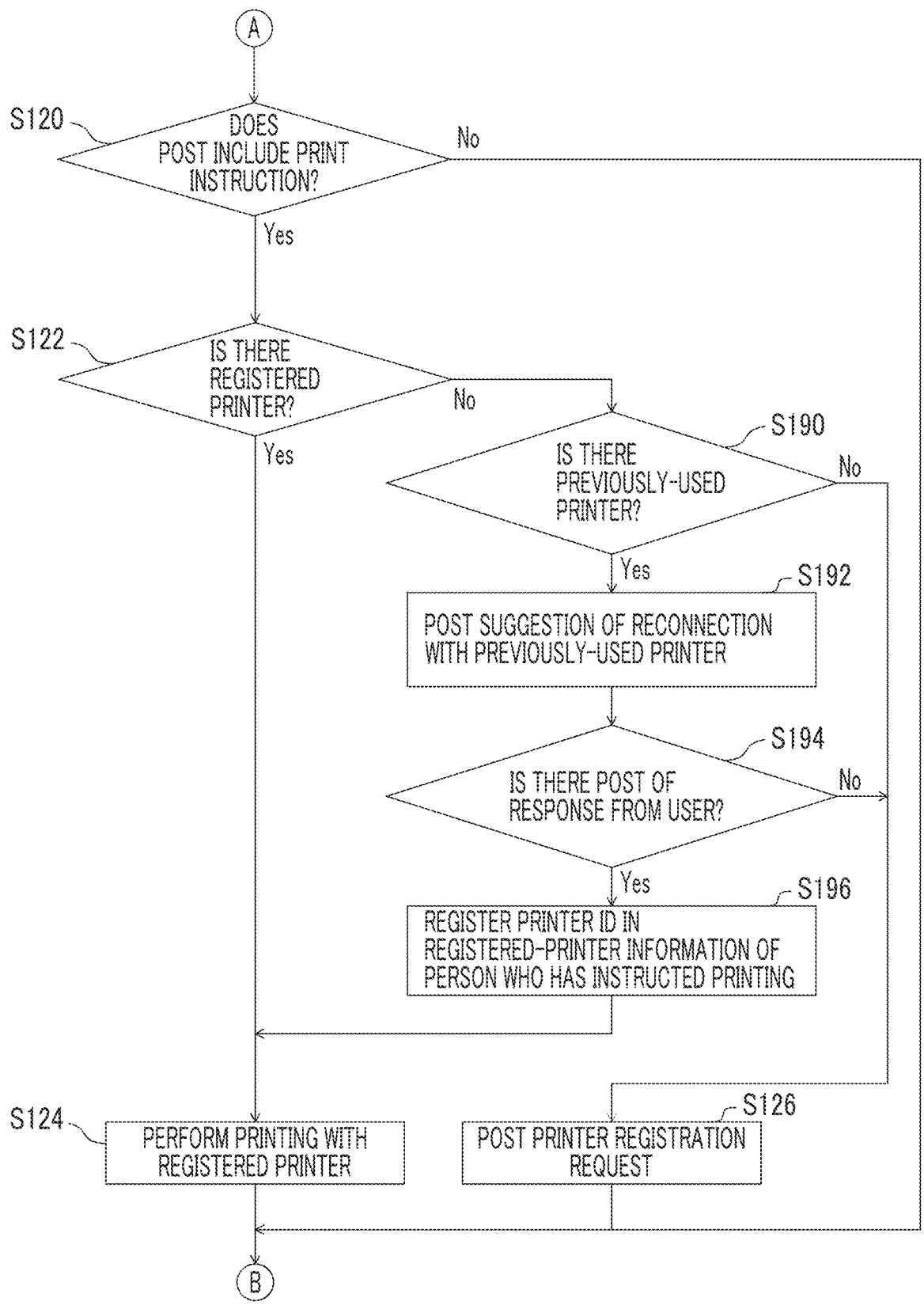
FIG. 18 is a diagram illustrating an example of a procedure of processing including a step of suggesting the printer which has been previously used.

FIG. 18 illustrates a processing procedure of the chatbot in the example. This procedure is a variation of processing in a case where the determination result in S120 in the procedure in FIG. 9 is No.

In FIG. 18, in a case where the determination result in S120 is No, that is, in a case where a printer is not registered for a user who has instructed to perform printing, the chatbot examines whether or not the user corresponds to "the previously-used printer" in the registered-printer information table (S190). In a case where the determination result in S190 is No, the chatbot proceeds to S126 and post a printer registration request into a chat room in which the user has posted a print instruction.

In a case where the determination result in S190 is Yes, the chatbot posts an inquiry of whether or not "the previously-used printer" is used, into the chat room (S192). The post may include information representing "the previously-used printer", for example, a printer name of the printer. The printer name may be registered in the printer DB 169 or the like, in advance, for each printer. The chatbot waits for a post as a response of the user to the inquiry, for predetermined time. In a case where the post as a response (that is, message indicating that using "the previously-used printer" is desired) is received from the user within the time (determination result in S194 is Yes), the chatbot registers "the previously-used printer" for the user (S196). That is, the printer ID in the "the previously-used printer" is registered in the "the current registered printer" of the user in the registered-printer information table (see FIG. 17). The chatbot proceeds to S124 and causes the printer corresponding to the printer ID to print the file as a print target, which relates to the print instruction. In a case where the determination result in S194 is No, that is, in a case where the post as a response is not received from the user within the predetermined time or a case where a post of refusing using of "the previously-used printer" is received, the chatbot proceeds to S126 and posts a message of requesting registration of the printer from the user, in the chat room. Regarding the post in S192, it may be inquired whether or not "the previously-used printer" is used. In a case where the printer is not used, the ID of a printer desired to be used may be posted. In this case, in a case where the user posts a code image of a printer ID in response to the inquiry post, the chatbot decodes the code image and registers the obtained printer ID in association with the user.

In the example in FIG. 18, the chatbot inquires, from the user, whether the user wants re-registration of "the previously-used printer" by a print instruction from the user as a trigger. Instead, when the user enters into a chat room (that is, participates), such an inquiry may be performed.

In the example in FIGS. 17 and 18, the printer ID in the previous time is stored and is suggested to the user the next time. Instead, a group of printer IDs registered in a plurality of previous registrations, for example, within predetermined period in the past or a predetermined number of registrations in the past, may be stored. One or more printer ID selected based on a predetermined criterion from the stored group of printer IDs may be suggested to the user. For example, the chatbot stores the printer ID which has been registered for one month in the past, for each user, in association with the date and time of the corresponding registration. In a case where the user enters into the chat room or a case where the user performs a print instruction in the chat room, the chatbot sets two printer IDs from the stored group of printer IDs, as candidates. The printers which have been registered the previous time and which the number of registrations is the most, are selected as candidates, and the chatbot performs a post the candidates to the user on the chat room, for example.

In the above descriptions, the post of the printer ID into the chat room in order to register a printer is made by posting a code image indicating the printer ID. As another example, the user may manually post a character string indicating the printer ID to the chat room. The printer ID may be allowed to be registered in both modes of inputting a code image and a character string. Here, in a case where the printer ID is posted to the user in a character string format, the chatbot needs to distinguish the post of the printer ID from a post of a normal message for being read by another chat participant. Therefore, in one example, the chatbot checks whether a character string included in a message indicates a printer ID registered in the printer DB 169, every time the message is posted in the chat room. In a case where such checking is performed on all posts, a processing burden of the chatbot is large. Thus, as still another example, when a print instruction is posted from a user into a chat room, in a case where the printer is not registered for the user, the chatbot may transition to a printer ID receiving mode by posting a message of requiring an input of the printer ID from the user, into the chat room. The chatbot may check whether the post from the user includes the printer ID, for predetermined time, for example, from the transition. In a case where it is once checked that the printer ID has been posted, the printer ID receiving mode ends. During a period in which the printer ID receiving mode is not performed, the chatbot does not check whether the message posted from the user includes the printer ID.

In the above description, the descriptions are made by using a case where printer registration is performed for each user, as the basic example. However, the similar control may also be applied to a case where printer registration is performed for each chat room. In a case where the printer registration is performed for each chat room, the ID of the printer associated with the chat room is registered in the registered-printer information table (that is, registered-printer information storage unit 166) in association with the ID of the chat room. The printer is registered for the chat room in a manner that the user participating in the chat room posts the printer ID for the chat room. In a case where the chat room is for a group chat, it is assumed that the registered printer is shared by a plurality of users participating in the chat room. Regarding the chat room for a group chat, the registration of the printer is not automatically released just in a case where the user performing an instruction to register the printer leaves the chat room. The registration of the printer may be automatically released in a case where there is no user (person) participating (that is, entering) in the chat room. In a case where the printer ID is posted from the user, the chatbot may inquire whether the printer ID is registered for the user or for the chat room, from the user. In a case where the printer ID is registered for the user, similar to the exemplary embodiment, in a case where the user leaves the chat room, the registration may be automatically released. In a case where the printer ID is registered for the chat room, the registration may not be automatically released until there is no person in the chat room.

Hitherto, the example of a case where the printer is controlled from the chatbot is described. Moreover, the control in the exemplary embodiment can also be applied to a chatbot that controls an output device other than the printer. Examples of the output device to which the control in the exemplary embodiment can be applied include a 3D printer that shapes a three-dimensional object, a speaker (for example, so-called AI speaker) that outputs sound, and a controller that controls a large screen display that displays a motion image and the like). For example, in a case of a chatbot that controls the speaker registered by the user, and in a case where a sound file is posted in a group chat, a sound file is transmitted to the speaker registered by the user (if necessary, in a state where the sound file is converted into a file having a data format which can correspond to the speaker) and is output.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing apparatus comprising:
a section that detects posts of an output instruction and an output target from a user in a chat room;
a control section that performs control of inputting a post requesting a registration of an output device from the user into the chat room in response to the output instruction and the output target in the detected post and further in response to a determination of no output device has been registered to perform an action of output in the chatroom;
a registration section that registers the output target as an output target corresponding to the user or the chat room, in a case where no output device has been registered for the user or the chat room when the post of the output target is detected, wherein the registration section further registers an output device for the first time in the chatroom upon receiving a post including identification information of the output device in the chatroom and the identification information is not registered for other user or other chatroom, and wherein, in response to a determination where the identification information of the output device is already registered for the other user or the other chatroom, a post requesting the other user to release the output device is posted in the other chatroom corresponding to the other user;

a registration release section that automatically releases the identification information registered by the user or the chatroom without an explicit release instruction being input from the user or in the chatroom after the identification information is registered to the user or the chatroom for a predetermined period of time; and an output instruction section that instructs the output device registered via the chatroom to output the output target in accordance to the output instruction posted in the chatroom.

2. The information processing apparatus according to claim 1, wherein the registration section includes a section that checks whether or not the information processing apparatus is capable of using the output device corresponding to the identification information included in the post from the user, via a network, and a section that inputs a post of requiring checking of a state of the output device for the user into the chat room in a case where it is determined that the output device is not usable by the checking.

3. The information processing apparatus according to claim 2, wherein, in a case where the identification information included in the post from the user has been registered as identification information of an output device corresponding to another user, the registration section waits for releasing registration of the identification information for the other user and then registers the identification information as the identification information of the output device corresponding to the user.

4. The information processing apparatus according to claim 3, further comprising:

a second registration section that decodes a code image in a case where the post input from the user into the chat room includes the code image, and registers, in a case where a decoding result indicates the identification information of the output device, the identification information as the identification information of the output device corresponding to the user or the chat room.

5. The information processing apparatus according to claim 2, further comprising:

a second registration section that decodes a code image in a case where the post input from the user into the chat room includes the code image, and registers, in a case where a decoding result indicates the identification information of the output device, the identification information as the identification information of the output device corresponding to the user or the chat room.

6. The information processing apparatus according to claim 5, wherein the second registration section includes a section that checks whether or not the information processing apparatus is capable of using the output device corresponding to the identification information included in the post from the user, via a network, and a section that inputs a post of requiring checking of a state of the output device for the user into the chat room in a case where it is determined that the output device is not usable by the checking.

7. The information processing apparatus according to claim 1, wherein, in a case where the identification information included in the post from the user has been registered as identification information of an output device corresponding to another user, the registration section waits for releasing registration of the identification information for the other user and then registers the identification information as the identification information of the output device corresponding to the user.

8. The information processing apparatus according to claim 7, further comprising:

a second registration section that decodes a code image in a case where the post input from the user into the chat room includes the code image, and registers, in a case where a decoding result indicates the identification information of the output device, the identification information as the identification information of the output device corresponding to the user or the chat room.

9. The information processing apparatus according to claim 1, further comprising:

a second registration section that decodes a code image in a case where the post input from the user into the chat room includes the code image, and registers, in a case where a decoding result indicates the identification information of the output device, the identification information as the identification information of the output device corresponding to the user or the chat room.

10. The information processing apparatus according to claim 9, wherein the second registration section includes a section that checks whether or not the information processing apparatus is capable of using the output device corresponding to the identification information included in the post from the user, via a network, and a section that inputs a post of requiring checking of a state of the output device for the user into the chat room in a case where it is determined that the output device is not usable by the checking.

11. The information processing apparatus according to claim 1, further comprising:

the registration release section is further configured to release the registration of the identification information associated with the user or the chat room without the explicit release instruction from the user based on a predetermined release condition.

12. The information processing apparatus according to claim 11, wherein the release condition is at least one of a condition in which the user has left the chat room, or a condition in which the information processing apparatus has left the chat room.

13. The information processing apparatus according to claim 11, wherein, in a case where the identification information of the output device is registered for a group chat in association with the chat room, a condition in which the user has left the chat room is not set as the release condition, and a condition in which all persons participating in the chat room have left the chat room is set as the release condition.

14. The information processing apparatus according to claim 11, further comprising:
a storage section that stores the identification information of which the registration has been released by the registration release section; and
a section that registers the identification information stored in the storage section as the identification information of the output device corresponding to the user or the chat room in a case where, after the user enters into the chat room, a post indicating a suggestion of using the output device corresponding to the identification info illation stored in the storage section is input into the chat room, and a message indicating that the suggestion is accepted from the user is posted in the chat room.

15. A non-transitory computer readable medium storing a program causing a computer to function as:
a section that detects posts of an output instruction and an output target from a user in a chat room;
a control section that performs control of inputting a post requesting a registration of an output device from the user into the chat room in response to the output instruction and the output target in the detected post and further in response to a determination of no output device has been registered to perform an action of output in the chatroom;
a registration section that registers the output target as an output target corresponding to the user or the chat room, in a case where no output device has been registered for the user or the chat room when the post of the output target is detected, wherein the registration section further registers an output device for the first time in the chat room upon receiving a post including identification information of the output device in the chatroom and the identification information is not registered for other user or other chat room, and wherein, in response to a determination where the identification information of the output device is already registered for the other user or the other chat room, a post requesting the other user to release the output device is posted in the other chat room corresponding to the other user;
a registration release section that automatically releases the identification information registered by the user or the chatroom without an explicit release instruction being input from the user or in the chatroom after the identification information is registered to the user or the chatroom and no post is inputted for a predetermined period of time; and
an output instruction section that instructs the output device registered via the chatroom to output the output target in accordance to the output instruction posted in the chatroom.

16. An information processing method comprising:
detecting posts of an output instruction and an output target from a user in a chat room;
performing control of inputting a post requesting a registration of an output device from the user into the chat room in response to the output instruction and the output target in the detected post and further in response to a determination of no output device has been registered to perform an action of output in the chatroom;
registering the output target as an output target corresponding to the user or the chat room, in a case where no output device has been registered for the user or the chat room when the post of the output target is detected, and further registering an output device for the first time in the chatroom upon receiving a post including identification information of the output device in the chatroom and the identification information is not registered for other user or other chatroom, and wherein, in response to a determination where the identification information of the output device is already registered for the other user or the other chatroom, a post requesting the other user to release the output device is posted in the other chatroom corresponding to the other user;
automatically releasing the identification information registered by the user or the chatroom without an explicit release instruction being input from the user or in the chatroom after the identification information is registered to the user or the chatroom and no post is inputted for a predetermined period of time; and
instructing the output device registered via the chatroom to output the output target in accordance to the output instruction posted in the chatroom.

17. The information processing method according to claim 16, further comprising:
checking whether or not the information processing apparatus is capable of using the output device corresponding to the identification information included in the post from the user, via a network, and
inputting a post of requiring checking of a state of the output device for the user into the chat room in a case where it is determined that the output device is not usable by the checking.

18. The information processing method according to claim 16, wherein, in a case where the identification information included in the post from the user has been registered as identification information of an output device corresponding to the other user, further waiting for releasing registration of the identification information for the other user and then registering the identification information as the identification information of the output device corresponding to the user.

19. The information processing method according to claim 16, further comprising:
decoding a code image in a case where the post input from the user into the chat room includes the code image, and registering, in a case where a decoding result indicates the identification information of the output device, the identification information as the identification information of the output device corresponding to the user or the chat room.

20. The information processing method according to claim 16, further comprising:
releasing registration of the identification information associated with the user or the chat room without the explicit release instruction from the user, based on a predetermined release condition, wherein the release condition is at least one of a condition in which the user has left the chat room, or a condition in which the information processing apparatus has left the chat room.

* * * * *